United States Patent
Roustant et al.

(10) Patent No.: US 11,726,973 B2
(45) Date of Patent: *Aug. 15, 2023

(54) INDEXING HEMS IN A DATABASE ENVIRONMENT

(71) Applicant: salesforce.com, inc., San Francisco, CA (US)

(72) Inventors: Bruno Roustant, Froges (FR); Juan Camilo Rodriguez Duran, Paris (FR)

(73) Assignee: salesforce.com, Inc., San Francisco, CA (US)

( * ) Notice: Subject to any disclaimer, the term of this patent is extended or adjusted under 35 U.S.C. 154(b) by 123 days.

This patent is subject to a terminal disclaimer.

(21) Appl. No.: 17/347,156

(22) Filed: Jun. 14, 2021

(65) Prior Publication Data
US 2021/0303535 A1    Sep. 30, 2021

Related U.S. Application Data

(63) Continuation of application No. 16/127,087, filed on Sep. 10, 2018, now Pat. No. 11,061,877.

(51) Int. Cl.
  *G06F 16/22*     (2019.01)
  *G06F 16/27*     (2019.01)
  *G06F 16/901*    (2019.01)

(52) U.S. Cl.
  CPC ...... *G06F 16/2246* (2019.01); *G06F 16/2272* (2019.01); *G06F 16/278* (2019.01); *G06F 16/9024* (2019.01)

(58) Field of Classification Search
  CPC .............. G06F 16/278; G06F 16/2246; G06F 16/2272; G06F 16/9024
  See application file for complete search history.

(56) References Cited

U.S. PATENT DOCUMENTS

| | | |
|---|---|---|
| 6,944,612 B2 | 9/2005 | Roustant et al. |
| 7,730,478 B2 | 6/2010 | Weissman |
| 7,779,039 B2 | 8/2010 | Weissman et al. |
| 7,783,630 B1 | 8/2010 | Chevalier et al. |
| 8,131,705 B2 | 3/2012 | Chevalier et al. |
| 8,311,960 B1 | 11/2012 | Ginzburg et al. |
| 8,401,842 B1 | 3/2013 | Ginzburg et al. |
| 9,027,144 B1 | 5/2015 | Roustant et al. |
| 10,223,396 B2 | 3/2019 | Roustant |
| 10,324,991 B2 | 6/2019 | Roustant |
| 2016/0179906 A1 | 6/2016 | Roustant et al. |
| 2017/0124203 A1 | 5/2017 | Roustant et al. |
| 2017/0212680 A1 | 7/2017 | Waghulde |
| 2017/0344545 A1 | 11/2017 | Roustant |

FOREIGN PATENT DOCUMENTS

EP    3249553 A1    11/2017

*Primary Examiner* — Hau H Hoang
(74) *Attorney, Agent, or Firm* — Haynes and Boone, LLP

(57) ABSTRACT

A minimal distinguishing prefix (MDP) is computed for terms included in a list of terms. The MDP for a term is the minimal prefix that differentiates the term from the immediately preceding term. Lengths of the computed MDPs are compared, and a set of MDPs is selected for inclusion in a trie. A trie generator generates a trie including a plurality of leaf nodes based on the selected MDPs, where each leaf node in the trie corresponds to a respective one of the selected MDPs, such that the terms accessible through a particular leaf node include the term corresponding to the respective one of the selected MDPs and any other terms positioned in the list between that term and a term corresponding to a next one of the selected MDPs in the trie.

20 Claims, 16 Drawing Sheets

| List of Terms 306 | MDPs 429 |
|---|---|
| antilions | a |
| antoninianus | anto |
| antoninianuses | antoninianuse |
| antonomasia | antono |
| antonomasias | antonomasia |
| antonym | antony |
| antonymic | antonymi |
| bark | b |
| base | bas |
| bash | bash |
| client | c |
| communication | co |
| communications | communications |

900

| Unencoded Terms 902 | Length of Common Prefix 904 | Incrementally Encoded Terms 906 |
|---|---|---|
| color | 0 | color |
| company | 2 | 2mpany |
| component | 4 | 4onent |
| credit | 1 | 1redit |

FIG. 9

INDEXING ITEMS IN A DATABASE ENVIRONMENT

CROSS-REFERENCE

This application is a continuation of and claims priority under 35 U.S.C. § 120 to co-pending and commonly-owned U.S. nonprovisional application Ser. No. 16/127,087, filed on Sep. 10, 2018, which is hereby expressly incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to database systems, and more specifically to indexing items in a database environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The reliable and efficient operation of queries on the database system to deliver information to a user has been and continues to be a goal of administrators of database systems.

BRIEF DESCRIPTION OF THE DRAWINGS

FIG. 9 illustrates an incremental encoding scheme for one or more blocks according to some embodiments.

Figure 1:
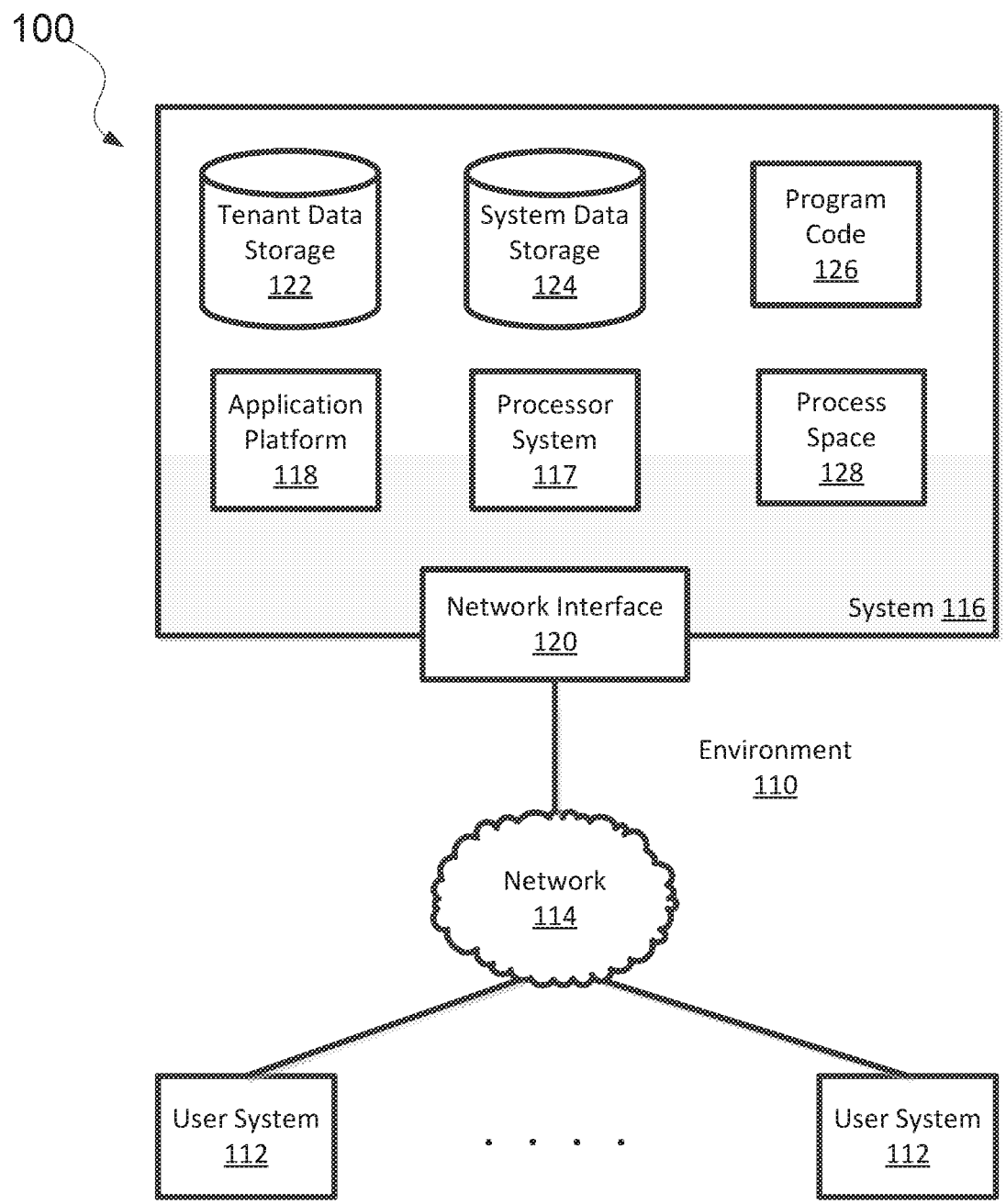
FIG. 1 illustrates a block diagram of an example environment wherein systems and methods for indexing items in a database environment may be incorporated or employed according to some embodiments.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Overview

Conventional database approaches might process a query relatively slowly if, for example, the query is inartfully drafted or the data is not well adapted to handling queries of a particular kind. A database system may also process a query relatively slowly if, for example, a relatively large number of users substantially concurrently access the database system. These problems have been addressed using custom indexes into the data. The query or a portion of the query is first applied to the index or to a filter and then the index provides limited number of hits with the database to which the rest of the query is applied.

The present disclosure provides techniques for indexing items in a database environment. A database may store items (e.g., a document or file) containing one or more terms. A user may desire to find all documents containing a particular search term. As the amount of data stored in the database grows, management of the data may become difficult. For example, the time it takes to search the database may increase as more data is stored in the database, thus decreasing a user's experience in interacting with the database. An index or database index is a data structure that is used to quickly locate and access data in a database. It may be desirable to index items in the database to speed up queries. Additionally, the indexing data structure, which may be referred to as trie in the present disclosure, may be stored in memory. It may be desirable to compact the trie, thus reducing the amount of storage space used in storage of the trie.

Example Environment

The system of the present disclosure can include, incorporate, or operate in conjunction with or in the environment of a multi-tenant cloud-based architecture.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

FIG. 1 illustrates a block diagram of an example environment 110 wherein systems and methods for indexing items in a database environment might be employed, and which may be used to implement embodiments described herein. Environment 110 may include user systems 112, network 114, system 116, processor system 117, application platform 118, network interface 120, tenant data storage 122, system data storage 124, program code 126, and process space 128 for executing database system processes and tenant-specific processes, such as running applications as part of an application hosting service. In other embodiments, environment 110 may not have all of the components listed and/or may have other elements instead of, or in addition to, those listed above.

In some embodiments, the environment 110 is an environment in which an on-demand database service exists. A user system 112 may be any machine or system that is used by a user to access a database user system. For example, any of user systems 112 can be a handheld computing device, a mobile phone, a laptop computer, a notepad computer, a work station, and/or a network of computing devices. As illustrated in FIG. 1 (and in more detail in FIG. 2) user systems 112 might interact via a network 114 with an on-demand database service, which is system 116.

An on-demand database service, such as that which can be implemented using the system 116, is a service that is made available to users outside of the enterprise(s) that own, maintain or provide access to the system 116. As described above, such users do not need to necessarily be concerned with building and/or maintaining the system 116. Instead, resources provided by the system 116 may be available for such users' use when the users need services provided by the system 116—e.g., on the demand of the users. Some on-demand database services may store information from one or more tenants stored into tables of a common database image to form a multi-tenant database system (MTS). Accordingly, the "on-demand database service 116" and the "system 116" will be used interchangeably herein. The term "multi-tenant database system" can refer to those systems in which various elements of hardware and software of a database system may be shared by one or more customers or tenants. For example, a given application server may simultaneously process requests for a great number of customers, and a given database table may store rows of data such as feed terms for a potentially much greater number of customers. A database image may include one or more database objects. A relational data base management system (RDBMS) or the equivalent may execute storage and retrieval of information against the database object(s).

The application platform 118 may be a framework that allows the applications of system 116 to run, such as the hardware and/or software infrastructure, e.g., the operating system. In an embodiment, on-demand database service 116 may include an application platform 118 that enables creating, managing, and executing one or more applications developed by the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system 112 to interact with system 116, that user system 112 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 114 is any network or combination of networks of devices that communicate with one another. For example, the network 114 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the "Internet" with a capital "I," that network will be used in many of the examples herein. However, it should be understood that the networks that the present disclosure might use are not so limited, although TCP/IP is a frequently implemented protocol.

The user systems 112 might communicate with system 116 using TCP/IP and, at a higher network level, use other common Internet protocols to communicate. Such as hypertext transfer protocol (HTTP), file transfer protocol (FTP), Andrew file system (AFS), wireless application protocol (WAP), etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least for the users that are accessing that server, each of the plurality of servers has access to the MTS data; however, other alternative configurations may be used instead.

In some embodiments, the system 116, shown in FIG. 1, implements a web-based customer relationship management (CRM) system. For example, in one embodiment, system 116 includes application servers configured to implement and execute CRM software applications as well as provide related data, code, forms, webpages and other information to and from user systems 112 and to store to, and retrieve from, a database system related data, objects, and web page content. With a multi-tenant system, data for multiple tenants may be stored in the same physical database object. However, tenant data typically is arranged so that data of one tenant is kept logically separate from that of other tenants so that one tenant does not have access to another tenant's data, unless such data is expressly shared. In certain embodiments, the system 116 implements applications other than, or in addition to, a CRM application. For example, system 16 may provide tenant access to multiple hosted (standard and custom) applications, including a CRM application. User (or third party developer) applications, which may or may not include CRM, may be supported by the application platform 118, which manages creation, storage of the applications into one or more database objects, and execution of the applications in a virtual machine in the process space of the system 116.

One arrangement for elements of the system 116 is shown in FIG. 1, including the network interface 120, the application platform 118, the tenant data storage 122 for tenant data 123, the system data storage 124 for system data 125 accessible to system 116 and possibly multiple tenants, the program code 126 for implementing various functions of the system 116, and the process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each of the user systems 112 could include a desktop personal computer, workstation, laptop, notepad computer, PDA, cell phone, or any wireless access protocol (WAP) enabled device or any other computing device capable of interfacing directly or indirectly to the Internet or other network connection. Each of the user systems 112 typically runs an HTTP client, e.g., a browsing program, such as Microsoft's Internet Explorer browser, Netscape's Navigator browser, Opera's browser, or a WAP-enabled browser in the case of a cell phone, notepad computer, PDA or other wireless device, or the like, allowing a user (e.g., subscriber of the multi-tenant database system) of the user systems 112 to access, process, and view information, pages, and applications available to it from the system 116 over the network 114. Each of the user systems 112 also typically includes one or more user interface devices, such as a keyboard, a mouse, trackball, touch pad, touch screen, pen or the like, for interacting with a graphical user interface (GUI) provided by the browser on a display (e.g., a monitor screen, liquid crystal display (LCD) monitor, light emitting diode (LED) monitor, organic light emitting diode (OLED) monitor, etc.) in conjunction with pages, forms, applications, and other information provided by the system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as the processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

According to one embodiment, the system 116 is configured to provide webpages, forms, applications, data and media content to the user (client) systems 112 to support the access by the user systems 112 as tenants of the system 116. As such, the system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object oriented data base management system (OODBMS) or rational database management system (RDBMS)) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
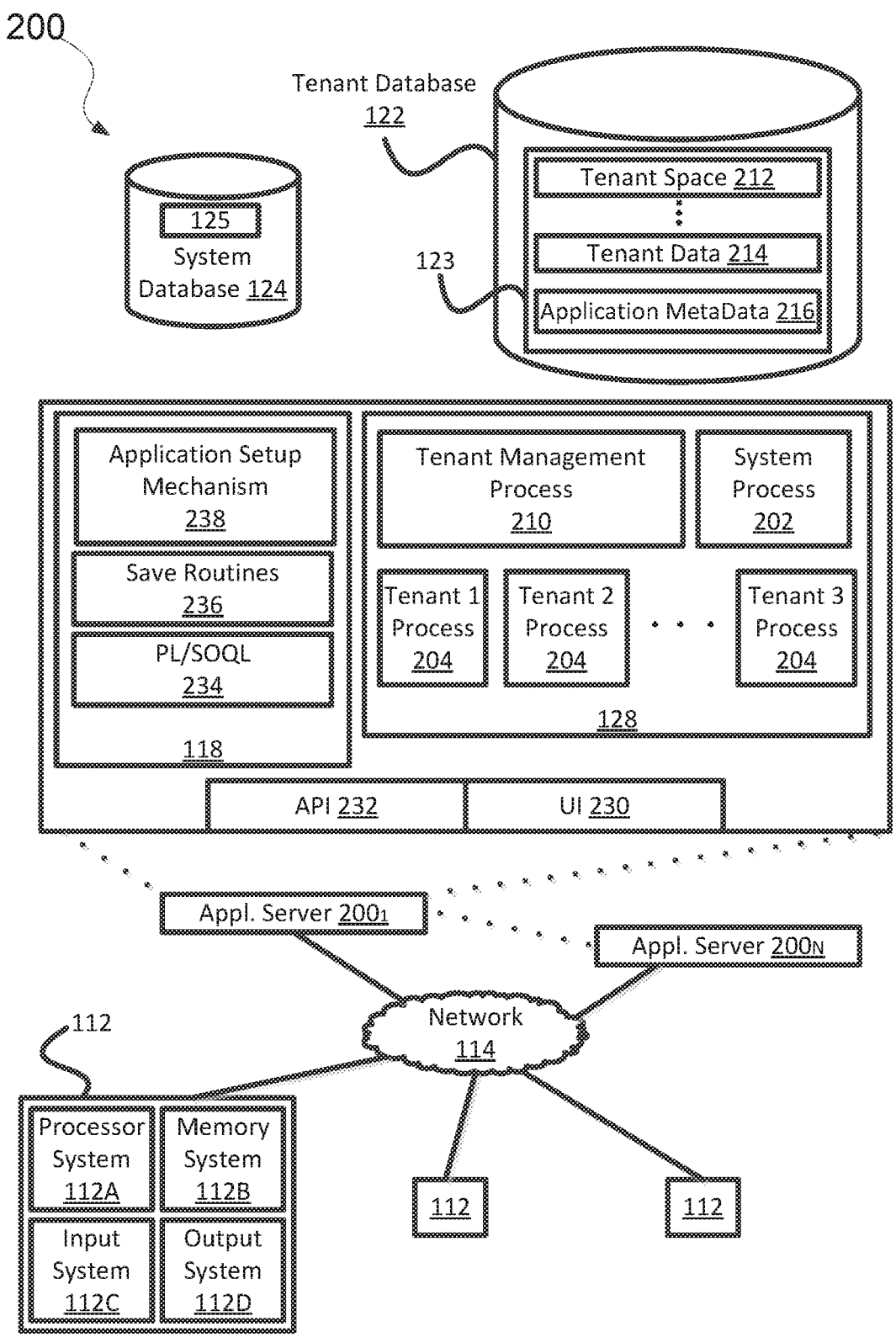
FIG. 2 illustrates a block diagram of another example environment according to some embodiments.

FIG. 2 also illustrates the environment 110, which may be used to implement embodiments described herein. FIG. 2 further illustrates elements of system 116 and various interconnections, according to some embodiments. FIG. 2 shows that each of the user systems 112 may include a processor system 112A, a memory system 112B, an input system 112C, and an output system 112D. FIG. 2 shows the network 114 and the system 116. FIG. 2 also shows that the system 116 may include the tenant data storage 122, the tenant data 123, the system data storage 124, the system data 125, a user interface (UI) 230, an application program interface (API) 232, a PL/Salesforce.com object query language (PL/SOQL) 234, save routines 236, an application setup mechanism 238, applications servers $200_1$-$200_N$, a system process space 202, tenant process spaces 204, a tenant management process space 210, a tenant storage area 212, a user storage 214, and application metadata 216. In other embodiments, environment 110 may not have the same elements as those listed above and/or may have other elements instead of, or in addition to, those listed above.

The user systems 112, the network 114, the system 116, the tenant data storage 122, and the system data storage 124 were discussed above in FIG. 1. Regarding the user systems 112, the processor system 112A may be any combination of one or more processors. The memory system 112B may be any combination of one or more memory devices, short term, and/or long term memory. The input system 112C may be any combination of input devices, such as one or more keyboards, mice, trackballs, scanners, cameras, and/or interfaces to networks. The output system 112D may be any combination of output devices, such as one or more monitors, printers, and/or interfaces to networks. As shown in FIG. 2, the system 116 may include the network interface 120 (of FIG. 1) implemented as a set of HTTP application servers 200, the application platform 118, the tenant data storage 122, and the system data storage 124. Also shown is system process space 202, including individual tenant process spaces 204 and the tenant management process space 210. Each application server 200 may be configured to access tenant data storage 122 and the tenant data 123 therein, and the system data storage 124 and the system data 125 therein to serve requests of the user systems 112. The tenant data 123 might be divided into individual tenant storage areas 212, which can be either a physical arrangement and/or a logical arrangement of data. Within each tenant storage area 212, the user storage 214 and the application metadata 216 might be similarly allocated for each user. For example, a copy of a user's most recently used (MRU) terms might be stored to the user storage 214. Similarly, a copy of MRU terms for an entire organization that is a tenant might be stored to the tenant storage area 212. The UI 230 provides a user interface and the API 232 provides an application programmer interface to the system 116 resident processes and to users and/or developers at the user systems 112. The tenant data and the system data may be stored in various databases, such as one or more Oracle™ databases.

The application platform 118 includes an application setup mechanism 238 that supports application developers' creation and management of applications, which may be saved as metadata into tenant data storage 122 by the save routines 236 for execution by subscribers as one or more tenant process spaces 204 managed by the tenant management process 210, for example. Invocations to such applications may be coded using PL/SOQL 234 that provides a programming language style interface extension to the API 232. Some embodiments of PL/SOQL language are discussed in further detail in U.S. Pat. No. 7,730,478, filed Sep. 21, 2007, entitled, "Method and System For Allowing Access to Developed Applications Via a Multi-Tenant On-Demand Database Service," which is incorporated herein by reference. Invocations to applications may be detected by one or more system processes, which manage retrieving the application metadata 216 for the subscriber, making the invocation and execution of the metadata as an application in a virtual machine.

Each application server 200 may be communicably coupled to database systems, e.g., having access to the system data 125 and the tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network connection used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5 Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, the system 116 is multi-tenant, wherein the system 116 handles storage of, and access to, different objects, data and applications across disparate users and organizations.

As an example of storage, one tenant might be a company that employs a sales force where each salesperson uses the system 116 to manage his or her sales process. Thus, a user might maintain contact data, leads data, customer follow-up data, performance data, goals and progress data, etc., all applicable to that user's personal sales process (e.g., in the tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 116 that are allocated at the tenant level while other data structures might be managed at the user level. Because a MTS might support multiple tenants including possible competitors, the MTS should have security protocols that keep data, applications, and application use separate. Also, because many tenants may opt for access to a MTS rather than maintain their own system, redundancy, up-time, and backup are additional functions that may be implemented in the MTS. In addition to user-specific data and tenant specific data, the system 116 might also maintain system level data usable by multiple tenants or other data. Such system level data might include industry reports, news, postings, and the like that are sharable among tenants.

In certain embodiments, the user systems 112 (which may be client systems) communicate with the application servers 200 to request and update system-level and tenant-level data from the system 116 that may require sending one or more queries to the tenant data storage 122 and/or the system data storage 124. The system 116 (e.g., an application server 200 in the system 116) automatically generates one or more structured query language (SQL) statements (e.g., one or more SQL queries) that are designed to access the desired information. The system data storage 124 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. Systems and methods for creating custom objects as well as customizing standard objects in a multi-tenant database system are described in further detail in U.S. Pat. No. 7,779,039, filed Apr. 2, 2004, entitled "Custom Entities and Fields in a Multi-Tenant Database System," which is incorporated herein by reference. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

In the environment of a multi-tenant database system, such as system 116, one or more of the organizations may wish to access information stored in the system. In an example, the multi-tenant database system includes a database that stores items (e.g., documents). An item may contain one or more terms, and a term may include one or more symbols or elements. A symbol and an element may be used interchangeably. For an enhanced or better user experience, it may be desirable to index items stored in a database. The indexing data structure may be referred to as a trie. At least a portion of the trie may be stored in memory, and at least a portion of the documents may be stored on disk. Accordingly, it may be desirable to ensure that the trie is compact and reduce its memory consumption. The present disclosure provides techniques for indexing items in a database as well as optimizing the trie used to navigate data stored in the database.

Indexing Items Stored in a Database

According to some embodiments, in the environment of a multi-tenant database system accessible by a plurality of organizations, such as system 116 shown and described with respect to FIGS. 1 and 2, systems and methods are provided for indexing items in a database environment.

Figure 3:
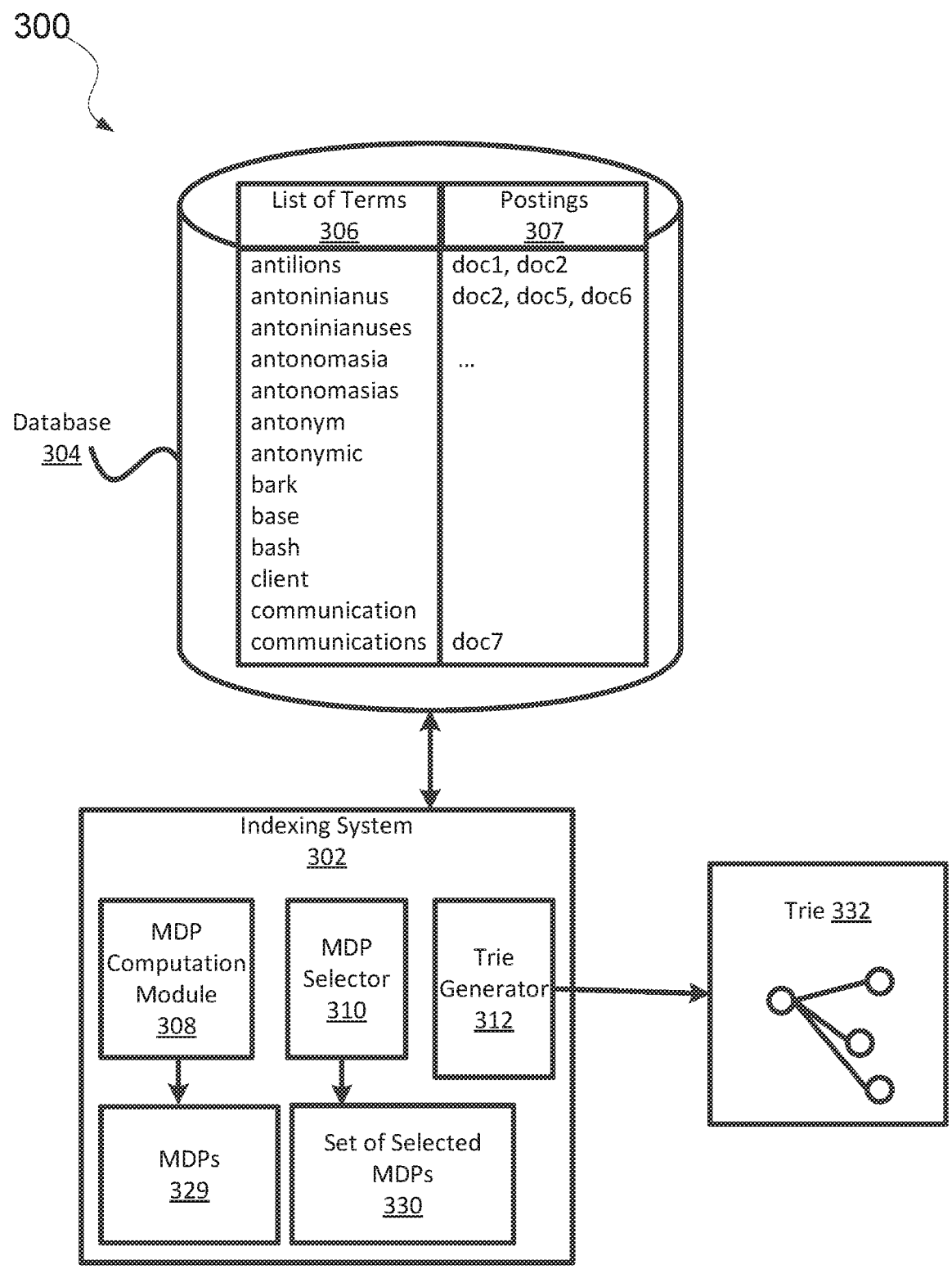
FIG. 3 illustrates a system block diagram for indexing items in a database according to some embodiments.

FIG. 3 illustrates a system block diagram 300 for indexing items in a database 304 according to some embodiments. The database 304 may correspond to the tenant data storage 122, the system data storage 124, or other database. In some embodiments, the database 304 is included, incorporated, or implemented in the multi-tenant system 116, as shown and described with reference to FIGS. 1 and 2, which provides or supports a system for, and is accessible by, a number of organizations. Users from such organizations may interact with the database 304 using respective user systems 112 (as described with reference to FIGS. 1 and 2) connected to or communicating with a front end system of the database.

The database 304 stores items (e.g., documents, files, etc.) containing one or more terms. A term may include any combination of symbols (e.g., letters, numbers, special characters, phrases, etc.). A user may desire to search full-text or structured documents for particular terms. In an example, the user may click on a search bar using the user system 112 and submit a request for documents containing multiple searched terms. Each document text is tokenized to extract terms, which may be stored in main memory or written to disk. A list of terms 306 is associated with postings 307, which lists document identifiers (IDs) containing the associated term. For example, the first term "antilions" may be found in the document having the document ID "doc1" and the document ID "doc2."

It may be impractical to store the entire list of terms 306 in memory because the list may include hundreds of thousands of terms. In a multi-tenant system, the amount of documents to index may be huge, thus making memory storage for all terms and postings prohibitive. In some examples, the list of terms 306 and the postings 307 may be stored on disk and sorted lexicographically.

In FIG. 3, the list of terms 306 includes thirteen terms in lexicographical order. A length of a term is the number of symbols included in the term. For example, the first term "antilions" has nine symbols, and thus has a length of nine. A first term precedes a second term if the first term is listed before the second term in the list of terms. Additionally, a first term immediately precedes a second term if the first term precedes the second term and no terms are listed between the first and second terms in the list of terms. A first term succeeds a second term if the first term is listed after the second term in the list of terms. Additionally, a first term immediately succeeds a second term if the first term succeeds the second term and no terms are listed between the first and second terms in the list of terms.

The indexing system 302 indexes documents for efficient search and retrieval of terms. An index or database index is a data structure that is used to quickly locate and access data in a database. As discussed, it may be impractical to store all the documents in memory and accordingly, at least some of the documents may be stored on disk. To efficiently search for terms on disk, the indexing system 302 may index documents stored in the database 304 by generating a trie and navigating the trie to find a specific block corresponding to a list of terms. The trie may be stored in main memory. A block is a small sub-list of terms, adapted to be read in a single disk access. The indexing system 302 scans the block, searching for the requested term. A block includes one or more terms and has a block key, which is the first term listed in the block. The block key is used in the trie to look for a term and find the single block that may contain the term. Additionally, a size of a block may be restricted to a size threshold, which is the maximum number of terms that the block may contain.

The indexing system 302 includes a minimal distinguishing prefix (MDP) computation module 308, a MDP selector 310, and a trie generator 312. The MDP computation module 308 may compute a MDP for each term included in the list of terms 306. The MDP for a term is the minimal prefix that differentiates the term from its immediately preceding term. The MDP computation module 308 computes MDPs 329 for the list of terms 306. For example, the "antilions" term does not have an immediately preceding term and thus its MDP is "a," the first symbol in the term. The MDP for the "antoninianus" term is "anto" because it takes a minimum of the first four symbols to distinguish the "antoninianus" term from the one immediately preceding it (the "antilions" term).

For one or more MDPs 329, the MDP selector 310 compares a length of the respective MDP to one or more lengths of a set of MDPs, and selects, based on the comparison, a MDP having a shorter length than at least one MDP of the set of MDPs. Accordingly, the MDP selector 310 selects, based on comparing the lengths of one or more MDPs, the set of selected MDPs 330.

The trie generator 312 generates a trie 332 that references terms. In an example, the trie 332 is stored in main memory, and the terms are stored on disk. Accordingly, it may be desirable for the trie 332 to be as compact as possible, thus reducing the amount of memory used to store the trie. The trie generator 312 uses the set of selected MDPs 330 to build the trie 332. In an example, the trie generator 312 generates the trie 332 including a plurality of leaf nodes based on the selected MDPs 330. Each leaf node in the trie 332 may correspond to a respective one of the selected MDPs, such that the terms accessible through a particular leaf node include the term corresponding to the respective one of the selected MDPs and any other terms positioned in the list between that term and a term corresponding to a next one of the selected MDPs in the trie.

Figures 4A, 4B:
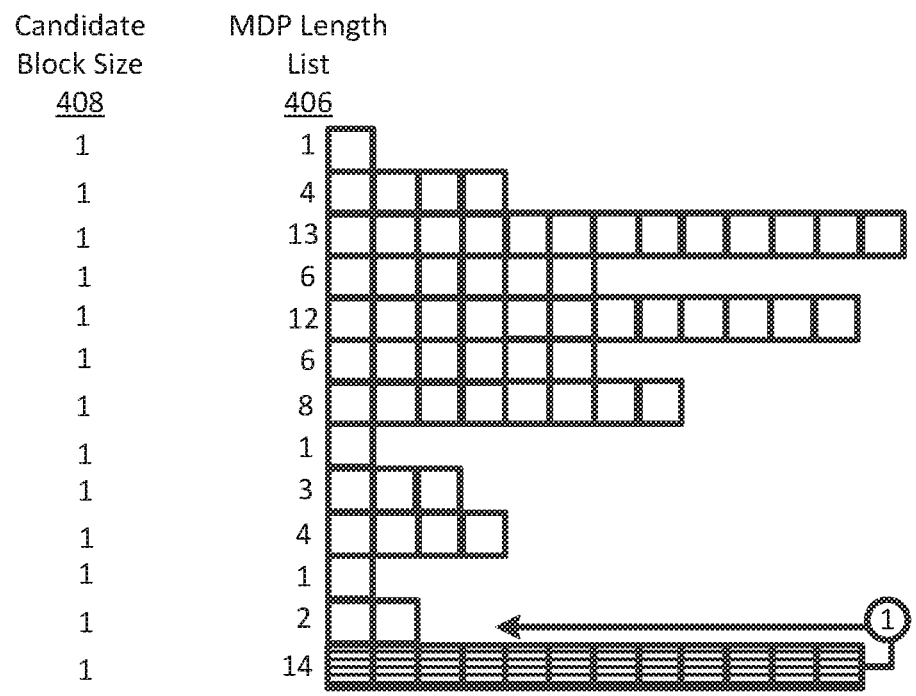
FIGS. 4A-4H illustrate a clustering-based partitioning scheme for selection of a set of minimal distinguishing prefixes (MDPs) according to some embodiments.

The MDP selector 310 may utilize various techniques for selecting the set of MDPs. FIGS. 4A-4H, 5, and 6 illustrate a clustering-based partitioning scheme 400 for selection of the set of MDPs according to some embodiments. Referring to FIG. 4A, the MDP computation module 308 computes the MDPs 429 for each term included in the list of terms 306. For example, the MDP for the term "antilions" is "a," the MDP for the term "antoninianus" is "anto," and so on.

The MDP selector 310 determines a length of each MDP 429. Referring to FIG. 4B, the MDP selector 310 may create an initial MDP length list 406, which includes a plurality of MDP lengths. Each MDP length in the MDP length list 406 corresponds to a computed MDP 429. Additionally, the MDP lengths in the MDP length list 406 are in the same order as their corresponding terms in the list of terms 306. For example, the first listed length "1" in the MDP length list 406 corresponds to the first listed MDP "a" for the first term, the second listed length "4" in the MDP length list 406 corresponds to the second listed MDP "anto" for the second term, and so on. Additionally, each MDP length in the MDP length list 406 is initially a candidate for removal and has an initial candidate block size 408, which is initially one term. In the example illustrated in FIGS. 4A-4H, 5, and 6, the size threshold is four, which provides for no more than four terms per block. It should be understood that in other examples, the size threshold may be greater than or less than four.

The MDP selector 310 iterates through the MDP length list 406 for candidates for removal from the list. In the example illustrated in FIGS. 4A-4H, the MDP selector 310 iterates through the MDP length list 406 starting from the last element in the list and proceeds upward towards the first element in the list. In other examples, the MDP selector 310 may iterate through the MDP length list 406 starting from the first element in the list and proceed downward towards the last element in the list.

For each subsequent iteration of the MDP length list, the MDP selector 310 identifies a first MDP length and a second MDP length, where the first MDP length is the longest length among candidates for removal in the MDP length list, and the second MDP length is located in the position immediately preceding the first MDP length. The longest length among candidates for removal may have one or more occurrences in the MDP length list. For example, if the MDP length "4" occurs more than once in the MDP length list, the MDP selector 310 may select the MDP length "4" that is encountered first when iterating the MDP length list.

The MDP selector 310 determines whether a sum of a candidate block size for the first MDP length and a candidate block size for the second MDP length exceeds a size threshold. If the sum does not exceed the size threshold, the MDP selector 310 removes the first MDP length from the MDP length list and updates the second MDP length's candidate block size to equal the sum. If the sum does not exceed the size threshold, the terms corresponding to the first and second MDP lengths will be located in the same block, as will be further discussed below. If, however, the sum exceeds the size threshold, the MDP selector 310 keeps the current MDP length list but removes the first MDP length from the candidates for removal. In this way, the MDP selector 310 may prevent a block from containing a number of terms exceeding its size threshold.

Referring to FIG. 4B, the MDP selector 310 iterates through the initial MDP length list 406 and identifies the MDP length "14" as being a longest length among candidates for removal. Additionally, the MDP selector 310 identifies the MDP length "2" as being located in the position immediately preceding the aforementioned longest length. The candidate block size for the MDP length "14" is one, and the candidate block size for the MDP length "2" is one. A sum of their candidate block sizes is two. The MDP selector 310 determines that the sum does not exceed four, which is the size threshold used in this example. Accordingly, the MDP selector 310 removes the MDP length "14" from the MDP length list 406 and updates the candidate block size for the MDP length "2" to equal two, which is the aforementioned sum.

Figure 4C:
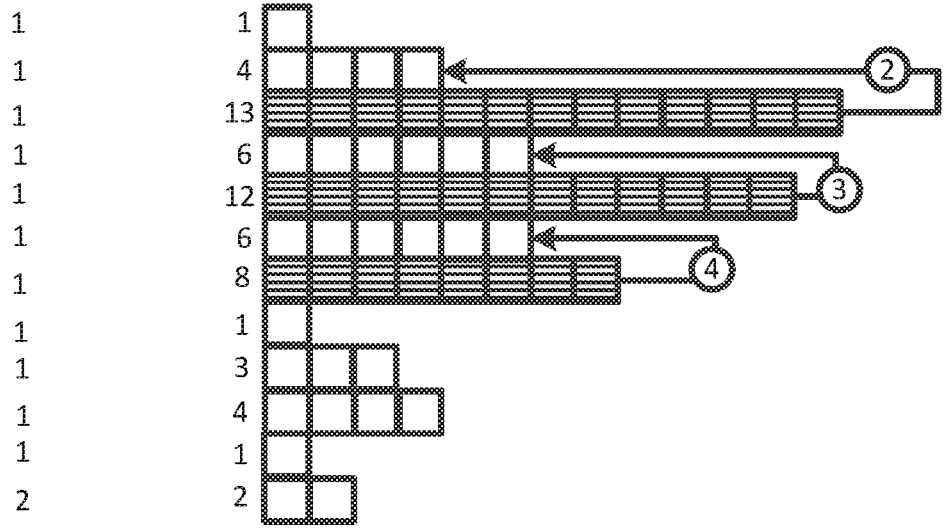

Referring to FIG. 4C, the current MDP length list 406 does not include the removed MDP length "14." Additionally, the candidate block size for the MDP length "2" has been updated to equal two. The MDP selector 310 may continue to iterate through the current MDP length list 406 until no more MDP lengths remain as candidates for removal. In a subsequent iteration of the MPD length list in FIG. 4C, the MDP selector 310 identifies the MDP length "13" as being a longest length among candidates for removal. Additionally, the MDP selector 310 identifies the MDP length "4" (2nd element in the MDP length list 406) as being located in the position immediately preceding the aforementioned longest length. The candidate block size for the MDP length "13" is one, and the candidate block size for the MDP length "4" is one. A sum of their candidate block sizes is two, and the MDP selector 310 determines that the sum does not exceed four. Accordingly, the MDP selector 310 removes the MDP length "13" from the MDP length list 406 and updates the candidate block size for the MDP length "4" to equal two, which is the aforementioned sum.

After the MDP length "13" is removed, the MDP selector 310 identifies the MDP length "12" as being a longest length among candidates for removal and identifies the MDP length "6" as being located in the position immediately preceding the aforementioned longest length. A sum of their candidate block sizes is two, which does not exceed the size threshold. Accordingly, the MDP selector 310 removes the MDP length "12" and updates the candidate block size for the MDP length "6" to equal two. After the MDP length "12" is removed, the MDP selector 310 identifies the MDP length "8" as being a longest length among candidates for removal and identifies the MDP length "6" as being located in the position immediately preceding the aforementioned longest length. A sum of their candidate block sizes is two, which does not exceed the size threshold. Accordingly, the MDP selector 310 removes the MDP length "8" and updates the candidate block size for the MDP length "6" to equal two.

Figure 4D:
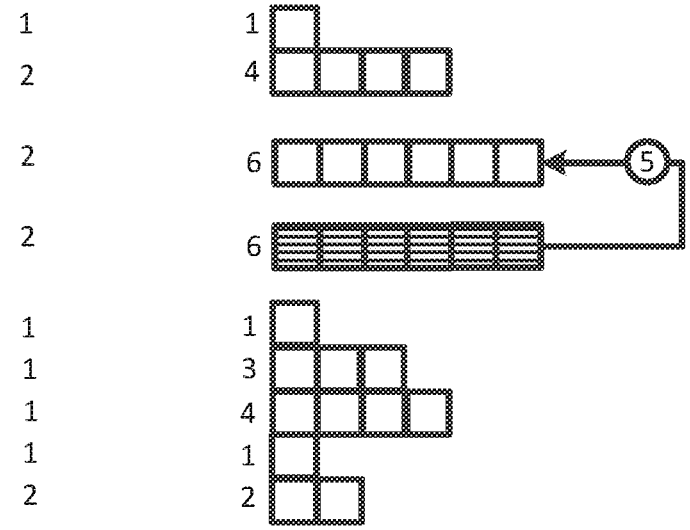

Referring to FIG. 4D, the current MDP length list 406 does not include the removed MDP lengths "13," "12," or "8," and the candidate block sizes for each MDP length located in the position immediately preceding the removed lengths have been updated. In particular, the candidate block size for the MDP length "4" (2nd element in the MDP length list 406) is two, the candidate block size for the MDP length "6" (3rd element in the MDP length list 406) is two, and the candidate block size for the MDP length "6" (4th element in the MDP length list 406) is two.

The MDP selector 310 may continue to iterate through the MDP length list 406 until no more MDP lengths remain as candidates for removal. In a subsequent iteration of the MPD length list in FIG. 4D, the MDP selector 310 identifies the MDP length "6" (4th element in the MDP length list 406) as being a longest length among candidates for removal. Additionally, the MDP selector 310 identifies the MDP length "6" (3rd element in the MDP length list 406) as being located in the position immediately preceding the aforementioned longest length. A sum of their candidate block sizes is four, which does not exceed the size threshold. Accordingly, the MDP selector 310 removes the aforementioned longest MDP length "6" and updates the candidate block size for the MDP length "6" that is located in the position immediately preceding the aforementioned longest length to equal four.

Figure 4E:
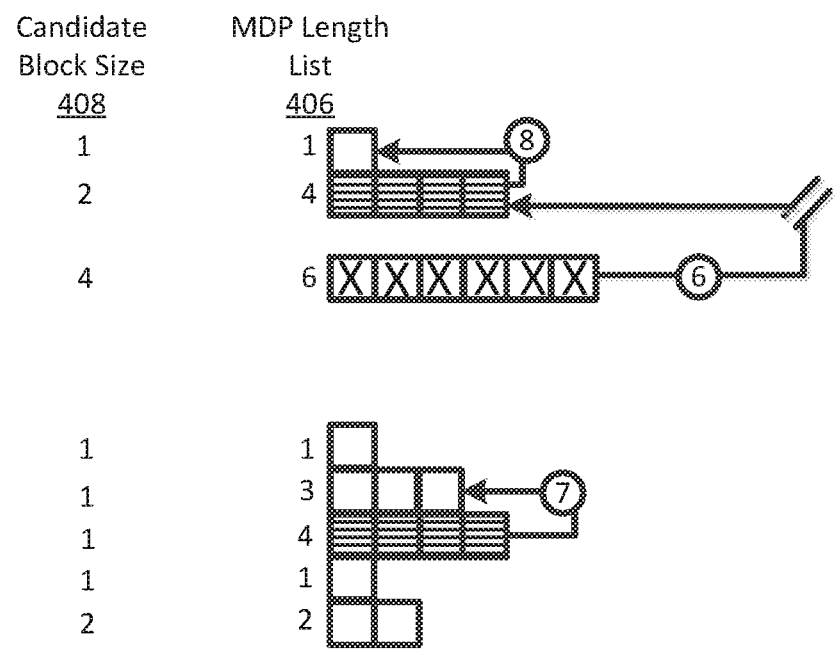

Referring to FIG. 4E, the current MDP length list 406 does not include the removed MDP length "6" (4th element in the MDP length list 406 in FIG. 4D) and the candidate block size for the MDP length "6" that is located in a position immediately preceding the removed MDP length is updated to equal four. The MDP selector 310 may continue to iterate through the MDP length list 406 until no more MDP lengths remain as candidates for removal. In a subsequent iteration of the MPD length list in FIG. 4E, the MDP selector 310 identifies the MDP length "6" (3rd element in the MDP length list 406) as being a longest length among candidates for removal. Additionally, the MDP selector 310 identifies the MDP length "4" (2nd element in the MDP length list 406) as being located in the position immediately preceding the aforementioned longest length. The candidate block size for the MDP length "6" is four, and the candidate block size for the MDP length "4" is two. A sum of these two candidate block sizes is six, which exceeds the size threshold. Accordingly, the MDP selector 310 keeps the current MDP length list but removes the MDP length "6" from the candidates for removal, as indicated by the "X" marks in the associated boxes.

In a subsequent iteration of the MPD length list in FIG. 4E, the MDP selector 310 identifies the MDP length "4" (6th element in the MDP length list 406) as being a longest length among candidates for removal. Additionally, the MDP selector 310 identifies the MDP length "3" (5th element in the current MDP length list 406) as being located in the position immediately preceding the aforementioned longest length. A sum of their candidate block sizes is two, which does not exceed the size threshold. Accordingly, the MDP selector 310 removes the MDP length "4" and updates the candidate block size for the MDP length "3" to equal two.

After the MDP length "4" is removed, in a subsequent iteration of the MPD length list in FIG. 4E, the MDP selector 310 identifies the MDP length "4" (2nd element in the MDP length list 406) as being a longest length among candidates for removal. Additionally, the MDP selector 310 identifies the MDP length "1" (1st element in the MDP length list 406) as being located in the position immediately preceding the aforementioned longest length. A sum of their candidate block sizes is three, which does not exceed the size threshold. Accordingly, the MDP selector 310 removes the MDP length "4" and updates the candidate block size for the MDP length "1" to equal three.

Figure 4F:
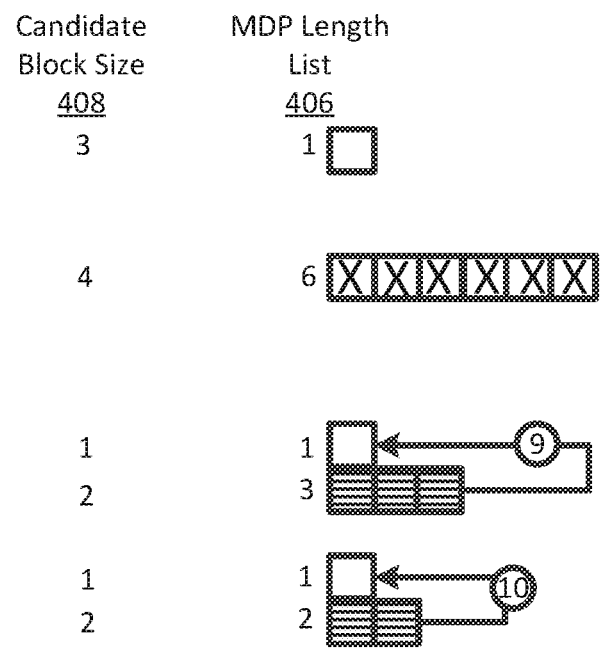

Referring to FIG. 4F, the current MDP length list 406 does not include the removed MDP lengths "4" (6th and 2nd elements in the MDP length list 406 in FIG. 4E), and the candidate block sizes for each MDP length located in the position immediately preceding the removed lengths have been updated. In particular, the candidate block size for the MDP length "3" (4th element in the MDP length list 406) is two, and the candidate block size for the MDP length "1" (1st element in the MDP length list 406) is three.

The MDP selector 310 may continue to iterate through the MDP length list 406 until no more MDP lengths remain as candidates for removal. In a subsequent iteration of the MPD length list in FIG. 4F, the MDP selector 310 removes the MDP length "3" (4th element in the MDP length list 406 in FIG. 4F) and updates the candidate block size of the MDP length "1" located in the position immediately preceding the aforementioned longest length to equal three. After removal of the MDP length "3," in a subsequent iteration of the MPD length list the MDP selector 310 removes the MDP length "2" (last element in the MDP length list) and updates the candidate block size of the MDP length "1" located in the position immediately preceding the aforementioned longest length to equal three.

Figure 4G:
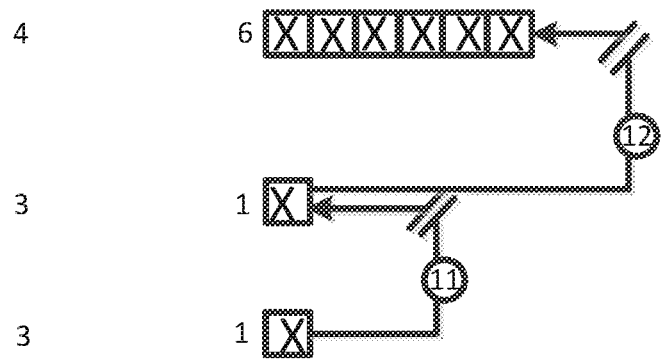

Referring to FIG. 4G, the current MDP length list 406 does not include the removed MDP length "3" (4th element in the MDP length list 406 in FIG. 4F) or the removed MDP length "2" (last element in the MDP length list 406 in FIG. 4F), and the candidate block sizes for each MDP length located in the position immediately preceding the removed lengths have been updated. In particular, the candidate block size for the MDP length "1" (3rd element in the MDP length list 406) is three, and the candidate block size for the MDP length "1" (4th element in the MDP length list 406) is three.

The MDP selector 310 may continue to iterate through the MDP length list 406 until no more MDP lengths remain as candidates for removal. For example, in a subsequent iteration of the MDP length list in FIG. 4G, the MDP selector 310 identifies the MDP length "1" (4th element in the MDP length list 406) as being a longest length among candidates for removal. Additionally, the MDP selector 310 identifies the MDP length "1" (3rd element in the MDP length list 406) as being located in the position immediately preceding the aforementioned longest length. A sum of their candidate block sizes is six (3+3), which exceeds the size threshold. Accordingly, the MDP selector 310 keeps the current MDP length list but removes the MDP length "1" (4th element in the MDP length list 406) from the candidates for removal, as indicated by the "X" marks in the boxes.

In a subsequent iteration of the MDP length list 406 in FIG. 4G, the MDP selector 310 identifies the MDP length "1" (3rd element in the MDP length list 406) as being a longest length among candidates for removal. Additionally, the MDP selector 310 identifies the MDP length "6" (2nd element in the current MDP length list 406) as being located in the position immediately preceding the aforementioned longest length. A sum of their candidate block sizes is seven, which exceeds the size threshold. Accordingly, the MDP selector 310 keeps the current MDP length list but removes the aforementioned MDP length "1" (3rd element in the MDP length list 406) from the candidates for removal, as indicated by the "X" marks in the boxes.

The MDP selector 310 may continue to iterate through the MDP length list 406 until no more MDP lengths remain as candidates for removal. After the above discussed iterations, one MDP length remains as a candidate for removal. In particular, in a subsequent iteration of the MPD length list, the MDP selector 310 identifies the MDP length "1" (1st element in the MDP length list 406 in FIG. 4G) as being a longest length among candidates for removal. The aforementioned MDP length "1" does not have an MDP that is located in the position immediately preceding it. Accordingly, the MDP selector 310 removes the MDP length "1" from the candidates for removal, as indicated by the "X" marks in the associated boxes.

Figure 4H:
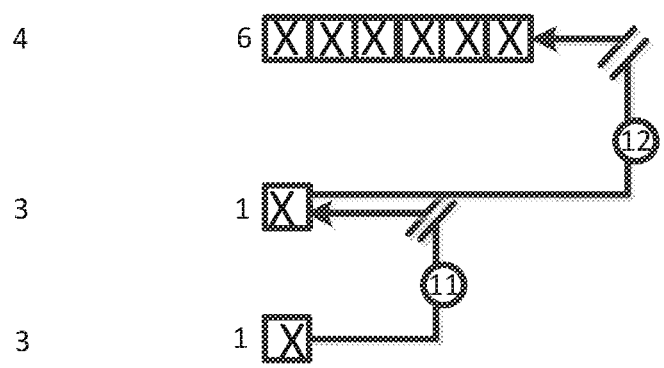

When there are no more MDP lengths remaining as candidates for removal, such as shown in FIG. 4H by the "X" marks associated with each MDP length in the MDP length list 406, the MDP selector 310 determines a remaining subset of MDP lengths from a final iteration of the MDP length list. In the example illustrated in FIG. 4H, the remaining subset of MDP lengths includes MDP lengths "1," "6," "1," and "1," which correspond to the first, fourth, eighth, and eleventh terms in the list of terms 306, respectively.

Figure 5:
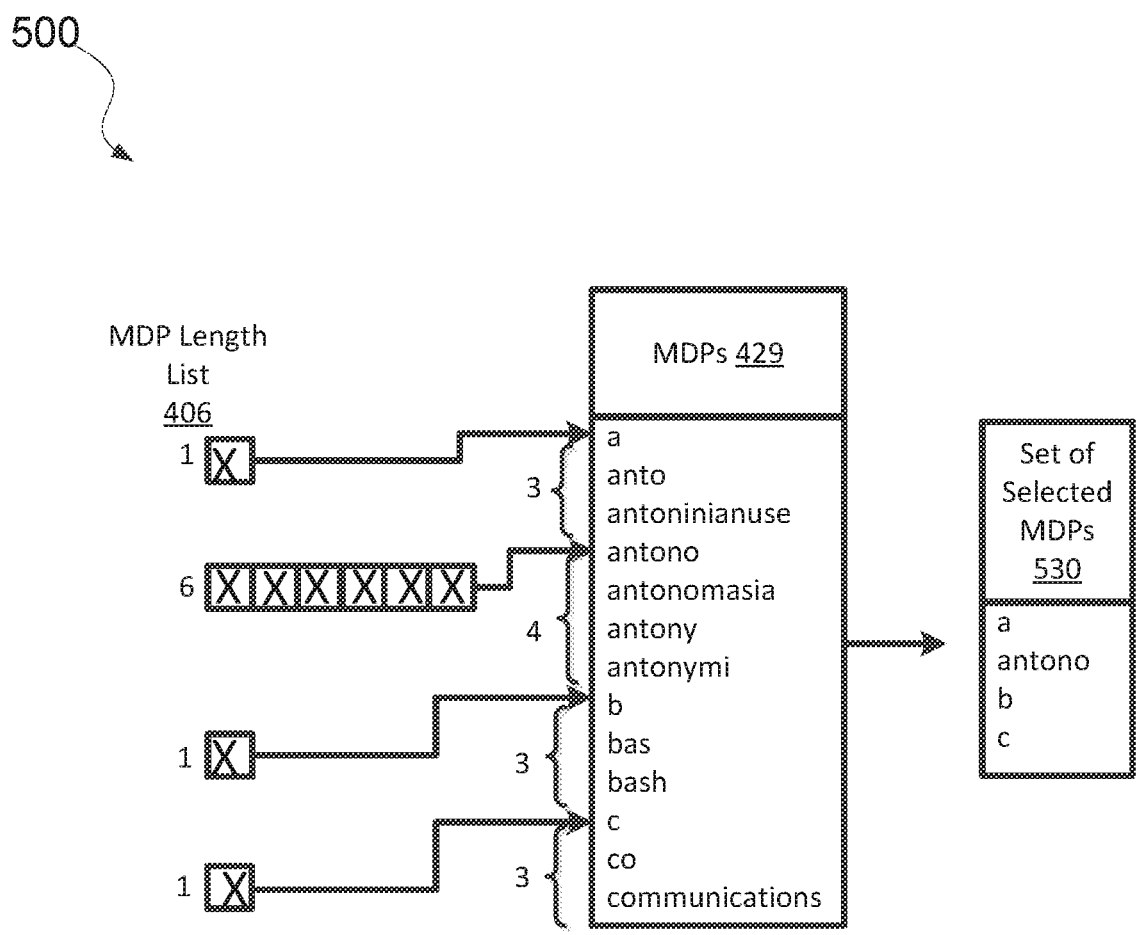
FIG. 5 illustrates a block diagram illustrating a remaining subset of MDP lengths and a set of selected MDPs according to some embodiments.

The MDP selector 310 selects the MDPs corresponding to the remaining subset of MDP lengths. FIG. 5 illustrates a block diagram 500 illustrating a remaining subset of MDP lengths and a set of selected MDPs 530 according to some embodiments. As discussed above, each MDP length in the MDP length list 406 corresponds to a computed MDP for a term in the list of terms, and the MDP lengths are in the same order as their corresponding terms in the list of terms. In the remaining subset of MDP lengths and in the same order as listed, the first MDP length "1" corresponds to the MDP "a," the second MDP length "6" corresponds to the MDP "antono," the third MDP length "1" corresponds to the MDP "b," and the fourth MDP length "1" corresponds to the MDP "c." Accordingly, the set of selected MDPs 530 includes "a," "antono," "b," and "c."

Figure 6:
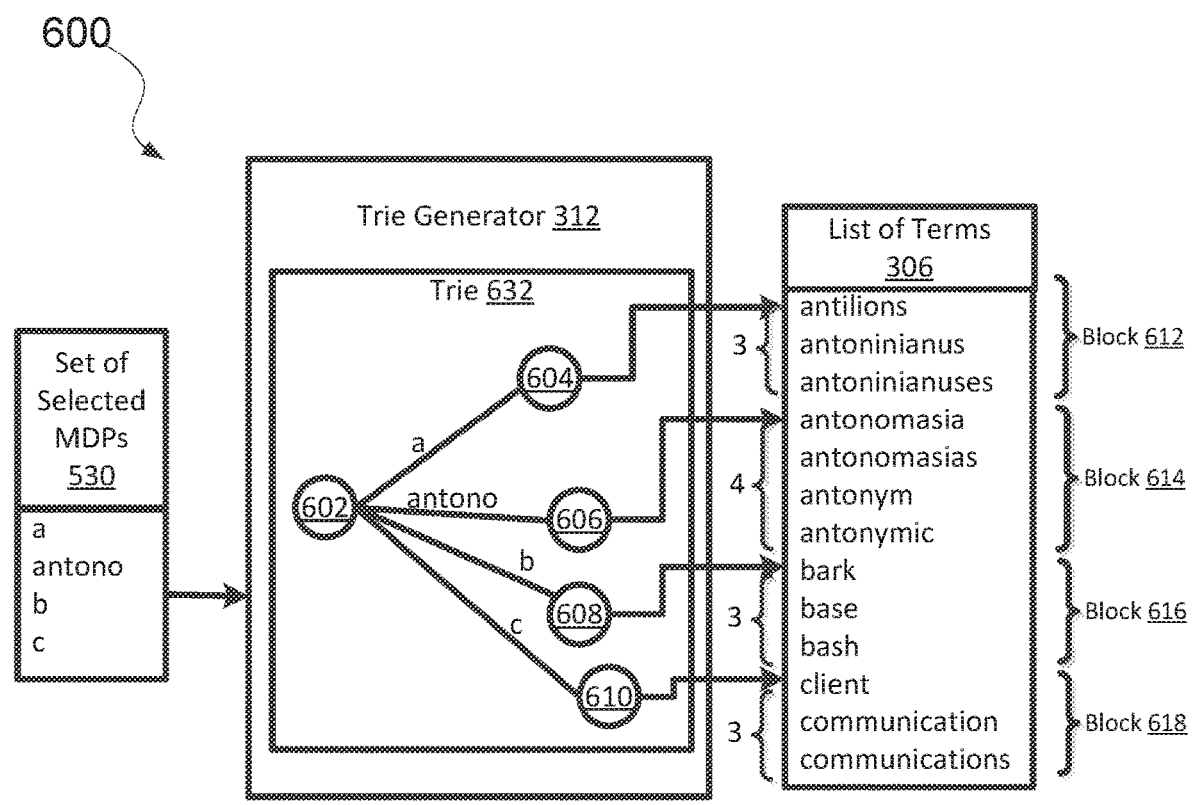
FIG. 6 illustrates a block diagram illustrating the generation of a trie according to some embodiments.

FIG. 6 illustrates a block diagram 600 illustrating the generation of a trie 632 in accordance with the set of selected MDPs 530 according to some embodiments. The trie generator 312 receives the set of selected MDPs 530 as input and stores each of the MDPs into the trie 632. In an example, the trie generator 312 generates the trie 632 including a plurality of nodes, each node referencing a term in the list of terms 306 and corresponding to a selected MDP for the term. It should be understood that reference to an edge storing a MDP may also refer to a node connected to the edge storing the MDP.

The trie 632 includes a root node 602 and nodes 604, 606, 608, and 610. An edge connecting the root node 602 and the node 604 stores the selected MDP "a," and the node 604 corresponding to the selected MDP "a" references the block key "antilions." The MDP for the term "antilions" is the MDP "a." An edge connecting the root node 602 and the node 606 stores the MDP "antono," and the node 606 corresponding to the selected MDP "antono" references the block key "antonomasia." The MDP for the term "antonomasia" is the MDP "antono." An edge connecting the root node 602 and the node 608 stores the selected MDP "b," and the node 608 corresponding to the selected MDP "b" references the block key "bark." The MDP for the term "bark" is the MDP "b." An edge connecting the root node 602 and the node 610 stores the selected MDP "c," and the node 610 corresponding to the selected MDP "c" references the block key "client." The MDP for the term "client" is the MDP "c."

In the example illustrated in FIG. 6, the trie generator 312 generates a trie 632 including a plurality of leaf nodes based on the set of selected MDPs 530. Each leaf node in the trie 632 corresponds to a respective one of the selected MDPs, such that the terms accessible through a particular leaf node include the term corresponding to the respective one of the selected MDPs and any other terms positioned in the list between that term and a term corresponding to a next one of the selected MDPs in the trie. The number of terms positioned in the list between that term and the term corresponding to the next one of the selected MDPs in the trie is equal to the candidate block size corresponding to that term. For example, the candidate block size for the first MDP length list "1" is equal to three, and the first MDP length list "1" corresponds to the first MDP "a." Accordingly, a block including the term "antilions" for which the MDP "a" is computed has three terms, which include that term and the two succeeding terms "antoninianus" and "antoninianuses" in the list of terms 306.

Referring to FIG. 6, the indexing system 302 partitions the list of terms 306 into a plurality of blocks 612, 614, 616, and 618, such that the referenced terms corresponding to the selected MDPs are block keys. For example, node 604 corresponds to the first MDP "a" in set of selected MDPs 530 and references the term "antilions," which is the block key for block 612. The candidate block size for the first MDP length "1" in the remaining subset of MDP lengths is equal to three, and the first MDP length "1" corresponds to the MDP "a." Accordingly, the block 612 including the term "antilions" for which the MDP "a" is computed has three terms, which include that term and the two succeeding terms "antoninianus" and "antoninianuses" in the list of terms 306. Node 606 corresponds to the second MDP "antono" in set of selected MDPs 530 and references the term "antonomasia," which is the block key for block 614. The candidate block size for the second MDP length "6" in the remaining subset of MDP lengths is equal to four, and the second MDP length "6" corresponds to the MDP "antono." Accordingly, the block 614 including the term "antonomasia" for which the MDP "antono" is computed has four terms, which include that term and the three succeeding terms "antonomasias," "antonym," and "antonymic" in the list of terms 306.

Node 608 corresponds to the third MDP "b" in set of selected MDPs 530 and references the term "bark," which is the block key for block 616. The candidate block size for the third MDP length "1" in the remaining subset of MDP lengths is equal to three, and the third MDP length "1" corresponds to the MDP "b." Accordingly, the block 616 including the term "bark" for which the MDP "b" is computed has three terms, which include that term and the two succeeding terms "base" and "bash" in the list of terms 306.

Node 610 corresponds to the fourth MDP "c" in set of selected MDPs 530 and references the term "client," which is the block key for block 618. The candidate block size for the fourth MDP length "1" in the remaining subset of MDP lengths is equal to three, and the fourth MDP length "1" corresponds to the MDP "c." Accordingly, the block 618 including the term "client" for which the MDP "c" is computed has three terms, which include that term and the two succeeding terms "communication" and "communcations" in the list of terms 306.

Although FIGS. 4A-4H and 5 illustrate the clustering-based partitioning scheme for selection of the set of MDPs, this is not intended to be limiting, and the MDP selector 310 may utilize other techniques for selecting the set of MDPs. In some examples, the MDP selector 310 performs a delta selecting partitioning scheme for selection of the set of MDPs.

Figure 7:
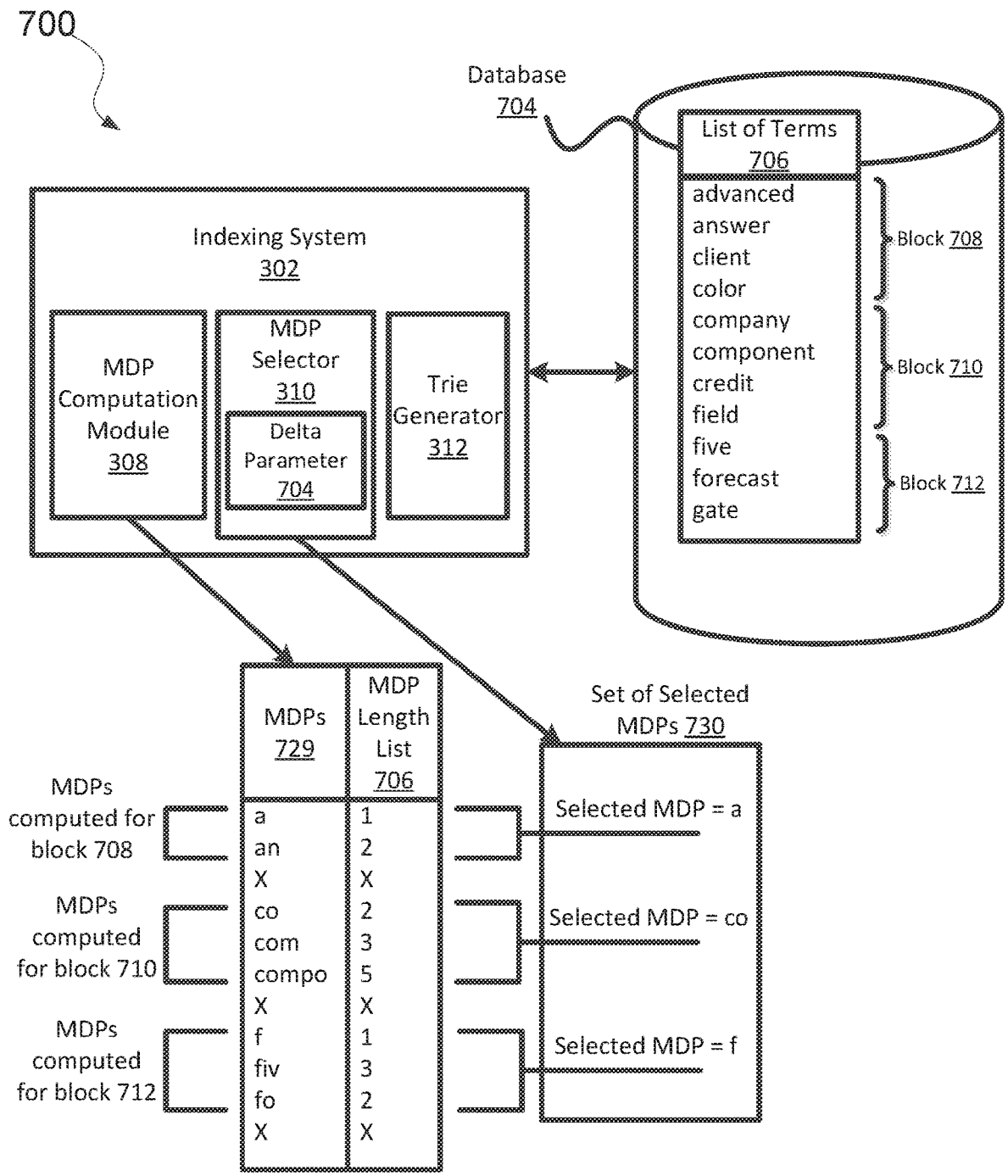
FIG. 7 illustrates a delta selecting partitioning scheme for selection of the set of MDPs according to some embodiments.

FIG. 7 illustrates a delta selecting partitioning scheme 700 for selection of the set of MDPs according to some embodiments. In FIG. 7, the indexing system 302 indexes items stored in a database 704, the items including one or more terms. A list of terms 706 includes eleven terms in lexicographical order. Although not illustrated, it should be understood that the list of terms 706 may be associated with postings. Additionally, in the discussion related to FIGS. 7 and 8, the size threshold of a block is four, although other size thresholds less than or greater than four are within the scope of the disclosure.

In the scheme 700, the indexing system 302 partitions, based on the size threshold, the list of terms 706 into a plurality of blocks 708, 710, and 712. The indexing system 302 attempts to partition the list of terms 706 evenly such that each block has a uniform size. If a quotient of the number of terms in the list of terms 706 divided by the size threshold does not have a remainder, the number of terms in each of the blocks is the same. If the quotient has a remainder, the number of terms in the blocks may differ by at most one. For example, each block of the plurality of blocks may contain at most a difference of one for a number of terms included in the respective block. The term "advanced" is the block key of block 708, the term "company" is the block key of block 710, and the term "five" is the block key of block 712. By having balanced block sizes, the indexing system 302 may provide optimal disk access performance because each disk access searches at least the maximum number of terms minus one.

For each block of the plurality of blocks, the MDP computation module 308 computes a respective MDP for the respective block key and for a plurality of terms within a threshold distance of the respective block key in the list of terms. In this example, the threshold distance refers to the delta parameter 704, which is one in the present example but may be greater than one in other examples. For each block of the plurality of blocks, the MDP selector 310 selects an MDP having a shorter length than another among the computed MDPs. In an example, the MDP selector 310 selects an MDP having the shortest length among the computed MDPs associated with the block.

In an example, for block 708, the MDP selector 310 computes the MDP "a" for the block key "advanced" and computes the MDP "an" for the term "answer," which has a distance of one from the block key. For block 710, the MDP selector 310 computes the MDP "com" for the block key "company," computes the MDP "co" for the preceding term "color" that has a distance of one from the block key, and computes the MDP "compo" for the succeeding term "component" that has a distance of one from the block key. For block 712, the MDP selector 310 computes the MDP "fiv" for the block key "five," computes the MDP "f" for the preceding term "field" that has a distance of one from the block key, and computes the MDP "fo" for the succeeding term "forecast" that has a distance of one from the block key.

The MDP selector 310 determines an MDP length list 706 including a plurality of MDP lengths, where each MDP length corresponds to a computed MDP for a term in the list of terms, and the MDP lengths are in the same order as their corresponding terms in the list of terms. For example, in the MDP length list 706, the first MDP length "1" corresponds to the computed MDP "a," the second MDP length "2" corresponds to the computed MDP "an," and so on. An "X" listed in the MDPs 729 or the MDP length list 706 may indicate that the MDP has not been computed or the MDP length has not been determined, respectively. It should also be understood that in other examples, the MDP computation module 308 may compute these MDPs and the MDP selector 310 may determine the associated MDP lengths.

The MDP selector 310 selects an MDP having the shortest MDP length among the computed MDPs. In an example, for MDPs computed for a block, the MDP selector 310 compares a length of the MDP for the block key to a length of the MDPs for a plurality of terms within a threshold distance of the block key. If the threshold distance is one, the MDP selector 310 compares an MDP length of the block key to the MDP lengths of one term preceding and one term succeeding the block key. In some examples, the threshold distance for terms preceding the block key is different from the threshold distance for terms succeeding the block key. In an example, the indexing system 302 may compare the MDP length of the block key with MDP lengths of the two terms immediately preceding the block key and the MDP lengths of the three terms succeeding the block key For the MDPs computed for block 708, the MDP selector 310 compares the MDP length of "a" (one) to the MDP length of "an" (two). The MDP selector 310 selects the MDP "a" because one is shorter than two, and the MDP "a" becomes part of the set of selected MDPs 730. For the MDPs computed for block 710, the MDP selector 310 compares the MDP length of "com" (three) to the MDP length of "co" (two) and the MDP length of "compo" (five). The MDP selector 310 selects the MDP "co" because two is shorter than both three and five, and the MDP "co" becomes part of the set of selected MDPs 730. For the MDPs computed for block 712, the MDP selector 310 compares the MDP length of "fiv" (three) to the MDP length of "f" (one) and the MDP length of "fo" (two). The MDP selector 310 selects the MDP "f" because one is shorter than both two and three, and the MDP "f" becomes part of the set of selected MDPs 730. Accordingly, the set of selected MDPs 730 includes "a," "co," and "f."

Figure 8:
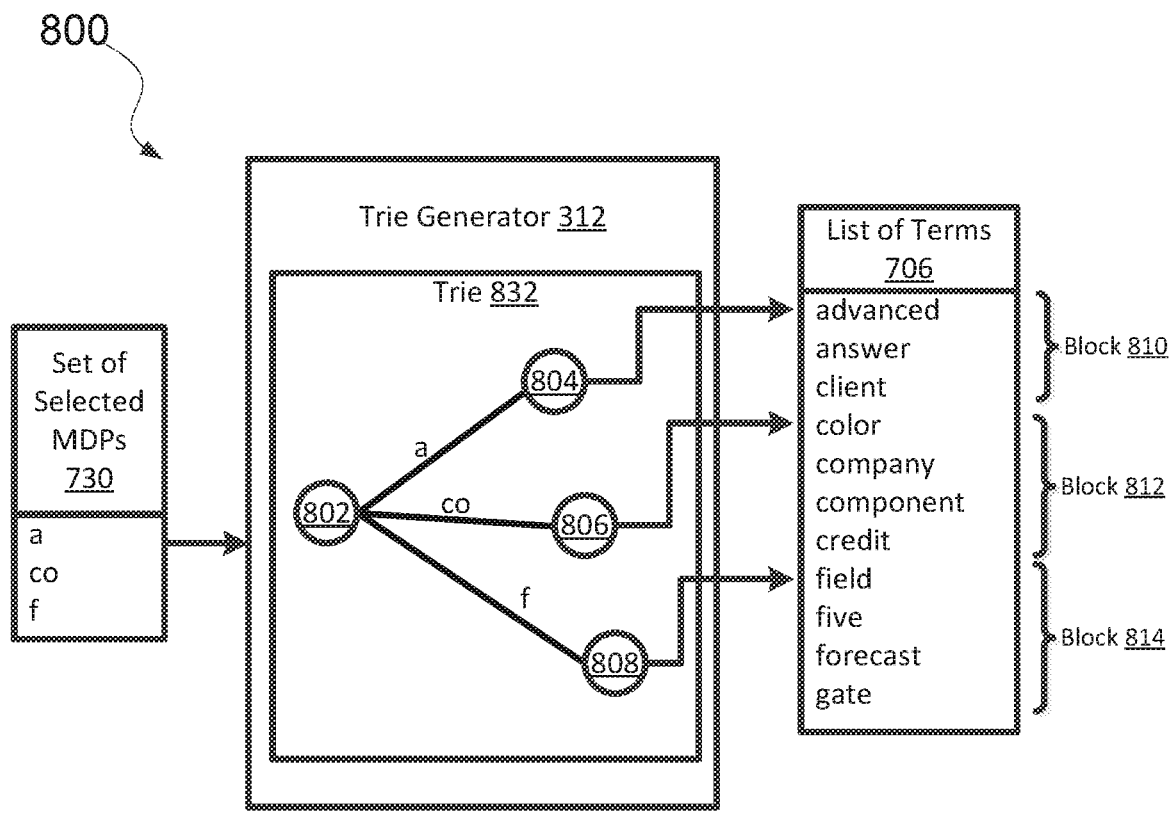
FIG. 8 illustrates a block diagram illustrating the generation of a trie according to some embodiments.

FIG. 8 illustrates a block diagram 800 illustrating the generation of a trie 832 in accordance with the set of selected MDPs 730 according to some embodiments. The trie generator 312 receives the set of selected MDPs 730 as input and stores each of the MDPs into the trie 832. In an example, the trie generator 312 generates the trie 832 including a plurality of nodes, each node referencing a term in the list of terms 706 and corresponding to a selected MDP for the term.

The trie 832 includes a root node 802 and nodes 804, 806, and 808. An edge connecting the root node 802 and a node 804 stores the selected MDP "a," and the node 804 corresponding to the selected MDP "a" references the block key "advanced." The MDP for the term "advanced" is the MDP "a." An edge connecting the root node 802 and a node 806 stores the MDP "co," and the node 806 corresponding to the selected MDP "co" references the block key "color." The MDP for the term "color" is the MDP "co." An edge connecting the root node 802 and a node 808 stores the selected MDP "f," and the node 808 corresponding to the selected MDP "f" references the block key "field." The MDP for the term "field" is the MDP "f."

The indexing system 302 re-partitions the list of terms 706 into a plurality of blocks 810, 812, and 814, such that the terms for which the selected MDPs are computed are block keys. The term "advanced" referenced by the node 804 is the block key for the block 810, the term "color" referenced by the node 806 is the block key for the block 812, and the term "field" referenced by the node 808 is the block key for the block 814. In the example illustrated in FIG. 8, the trie generator 312 generates a trie 832 including a plurality of leaf nodes based on the set of selected MDPs 730. Each leaf node in the trie 832 corresponds to a respective one of the selected MDPs, such that the terms accessible through a particular leaf node include the term corresponding to the respective one of the selected MDPs and any other terms positioned in the list between that term and a term corresponding to a next one of the selected MDPs in the trie.

The terms accessible through the node 804 include the term "advanced" corresponding to the selected MDP "a" and the terms "answer" and "client," which are terms positioned in the list between the term "advanced" and the term "color" corresponding to a next one of the selected MDPs in the trie 832. Additionally, the terms accessible through the node 806 include the term "color" corresponding to the selected MDP "co" and the terms "company," "component," and "credit," which are terms positioned in the list between the term "color" and the term "field" corresponding to a next one of the selected MDPs in the trie 832. Additionally, the terms accessible through the node 808 include the term "field" corresponding to the selected MDP "f" and the terms "five," "forecast," and "gate."

It may be desirable to further reduce the amount of data in each block, thus reducing the amount of memory used to store the block. Additionally, doing so may result in scans of the block for a term being less time consuming. FIG. 9 illustrates an incremental encoding scheme 900 for one or more blocks according to some embodiments. The incremental encoding scheme 900 involves compacting a prefix a term may have in common with its preceding term. In FIG. 9, unencoded terms 902 include "color," "company," "component," and "credit." For the unencoded terms 902, the indexing system 302 may determine a length of common prefix 904 and incrementally encoded terms 906. The length of common prefix for a term is the number of symbols in the term prefix that is the same as its immediately preceding term. The MDP selector 310 calculates a length of a common prefix for a given term relative to its immediately preceding term.

The term "color" is the first listed term and thus the length of the common prefix for the term "color" is zero. The first two terms "color" and "company" have the common prefix "co," and thus a length of the common prefix for the term "company" is two. Accordingly, the indexing system 302 may skip the first two letters and replace these two letters with a binary representation of the length. In an example, the binary representation is one byte and is "0000 0010." Additionally, the terms "company" and "component" have the common prefix "comp," and thus a length of the common prefix for the term "component" is four. Accordingly, the indexing system 302 may skip the first four letters and replace these four letters with a binary representation of the length. In an example, the binary representation is one byte and is "0000 0100." The terms "component" and "credit" have the common prefix "c," and thus a length of the common prefix for the term "credit" is one. Accordingly, the indexing system 302 may skip the first letter and replace this letter with a binary representation of the length. In an example, the binary representation is one byte and is "0000 0001."

The indexing system 302 may navigate the trie to find the block containing a search term. If the indexing system 302 does not find the term in the trie, the indexing system 302 may find the floor element, which refers to the element immediately preceding lexicographically the lookup term. The indexing system 302 supports backward traversal of the trie and its edges/nodes to find the immediately preceding leaf according to the term sorting order.

Figure 10:
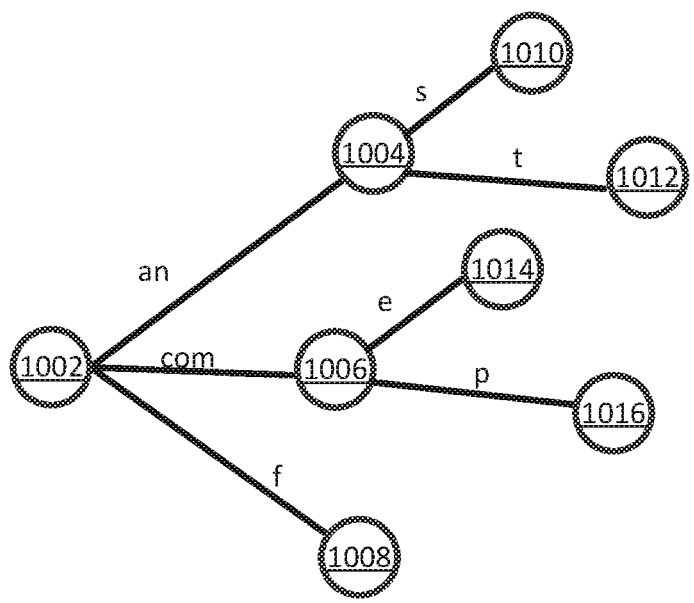
FIG. 10 illustrates a trie according to some embodiments.

FIG. 10 illustrates a trie 1032 according to some embodiments. The trie 1032 includes a root node 1002, an edge storing an MDP "an" that connects the root node 1002 and a node 1004, an edge storing an MDP "corn" that connects the root node 1002 and a node 1006, and an edge storing an MDP "f" that connects the root node 1002 and a node 1008. An edge storing an MDP "s" connects nodes 1004 and 1010, and an edge storing an MDP "t" connects nodes 1004 and node 1012. Additionally, an edge storing an MDP "e" connects nodes 1006 and 1014, and an edge storing an MDP "p" connects nodes 1006 and 1016.

In an example, the search term is "come." In this example, the indexing system 302 navigates the trie 1032 by traversing the root node 1002, the node 1006, and then the node 1014, thus finding the term "come." In another example, the search term is "comet." In this example, the indexing system 302 navigates the trie 1032 by traversing the root node 1002, the node 1006, and then the node 1014, which does not have a child node. The indexing system 302 has not found the search term and falls back to node 1014 as the floor of the search, concluding that the term "comet" is not found.

In another example, the search term is "comic." In this example, the indexing system 302 navigates the trie 1032 by traversing the root node 1002 and the node 1006, which does not have a child node. The last preceding child of node 1006 is the node 1014, and thus the indexing system 302 falls back to node 1014 as the floor of the search, and concludes that the term "comic" is not found. In another example, the search term is "coma." In this example, the indexing system 302 navigates the trie 1032 by traversing the root node 1002 and the node 1006, which does not have a child node. The last preceding child of node 1002 is the node 1004. The indexing system 302 recursively follows the last child node, and falls back to node 1012 as the floor of the search, concluding that the term "coma" is not found.

Operational Flows

Figure 11:
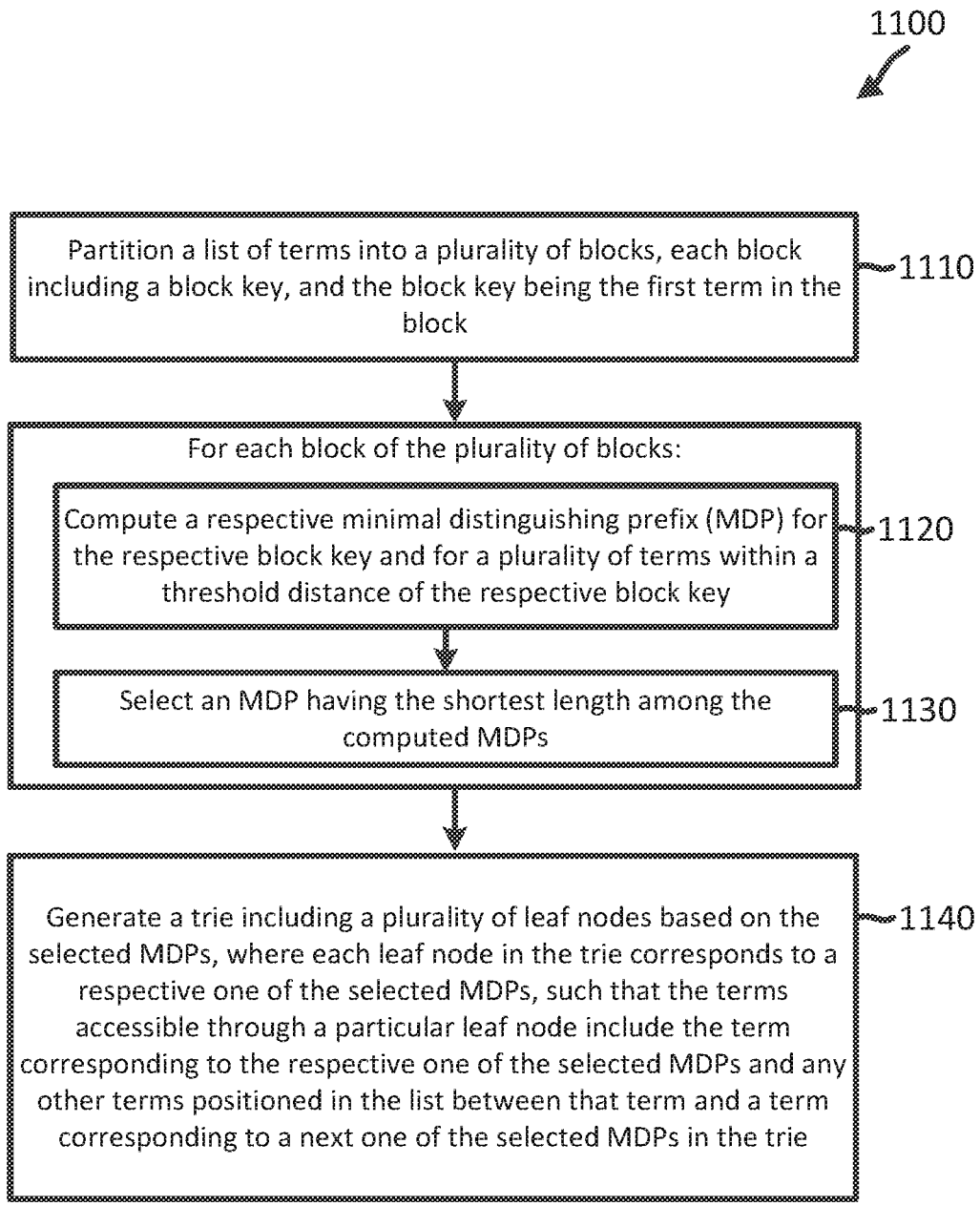
FIG. 11 is a simplified diagram of a method for indexing items in accordance with a delta selecting partitioning scheme in a database environment according to some embodiments.

FIG. 11 is a simplified diagram of a method 1100 for indexing items in accordance with a delta selecting partitioning scheme in a database environment according to some embodiments. One or more of the processes 1110-1140 of the method 1100 may be implemented, at least in part, in the form of executable code stored on non-transitory, tangible, machine-readable media that when run by one or more processors may cause the one or more processors to perform one or more of the processes 1110-1140. In some embodiments, method 1100 can be performed by one or more computing devices in systems or diagrams 100, 200, 300, 700, and 800 of FIGS. 1, 2, 3, 7, and 8, respectively, including the MDP computation module 308, MDP selector 310, and/or trie generator 312. Aspects of the processes 1110-1140 of method 1100 have been covered in the description for FIGS. 1, 2, 3, 7, and 8; additional aspects are provided below.

In FIG. 11, at a process 1110, the indexing system 302 partitions a list of terms into a plurality of blocks, each block including a block key, and the block key being the first term in the block. In the example illustrated in FIG. 7, the indexing system 302 partitions, based on a size threshold, the list of terms 706 into blocks 708, 710, and 712. The indexing system 302 may divide the number of terms in the list by the size threshold to determine how many blocks to create, where the number of terms in the blocks may differ by at most one.

For each block of the plurality of blocks, the MDP selector 310 may perform the processes 1120 and 1130. At a process 1120, the MDP selector 310 computes a respective MDP for the respective block key and for a plurality of terms within a threshold distance of the respective block key. The MDP for a term is the minimal prefix that differentiates the term from its immediately preceding term. The threshold distance may be any whole number greater than one.

At a process 1130, the MDP selector 310 selects an MDP having the shortest length among the computed MDPs. In an example, the MDP selector 310 compares an MDP length of the respective MDP to one or more MDP lengths associated with the plurality of terms. The MDP selector 310 selects, based on the comparison of MDP lengths, the MDP having a shorter MDP length than at least one other compared MDP length. In an example, the MDP having the shortest MDP length is selected. After performing the processes 1120 and 1130 at least one time, each of the selected MDPs may be used to generate a trie.

At a process 1140, the trie generator 312 generates a trie 832 including a plurality of leaf nodes based on the selected MDPs, where each leaf node in the trie corresponds to a respective one of the selected MDPs, such that the terms accessible through a particular leaf node include the term corresponding to the respective one of the selected MDPs and any other terms positioned in the list between that term and a term corresponding to a next one of the selected MDPs in the trie.

Figure 12:
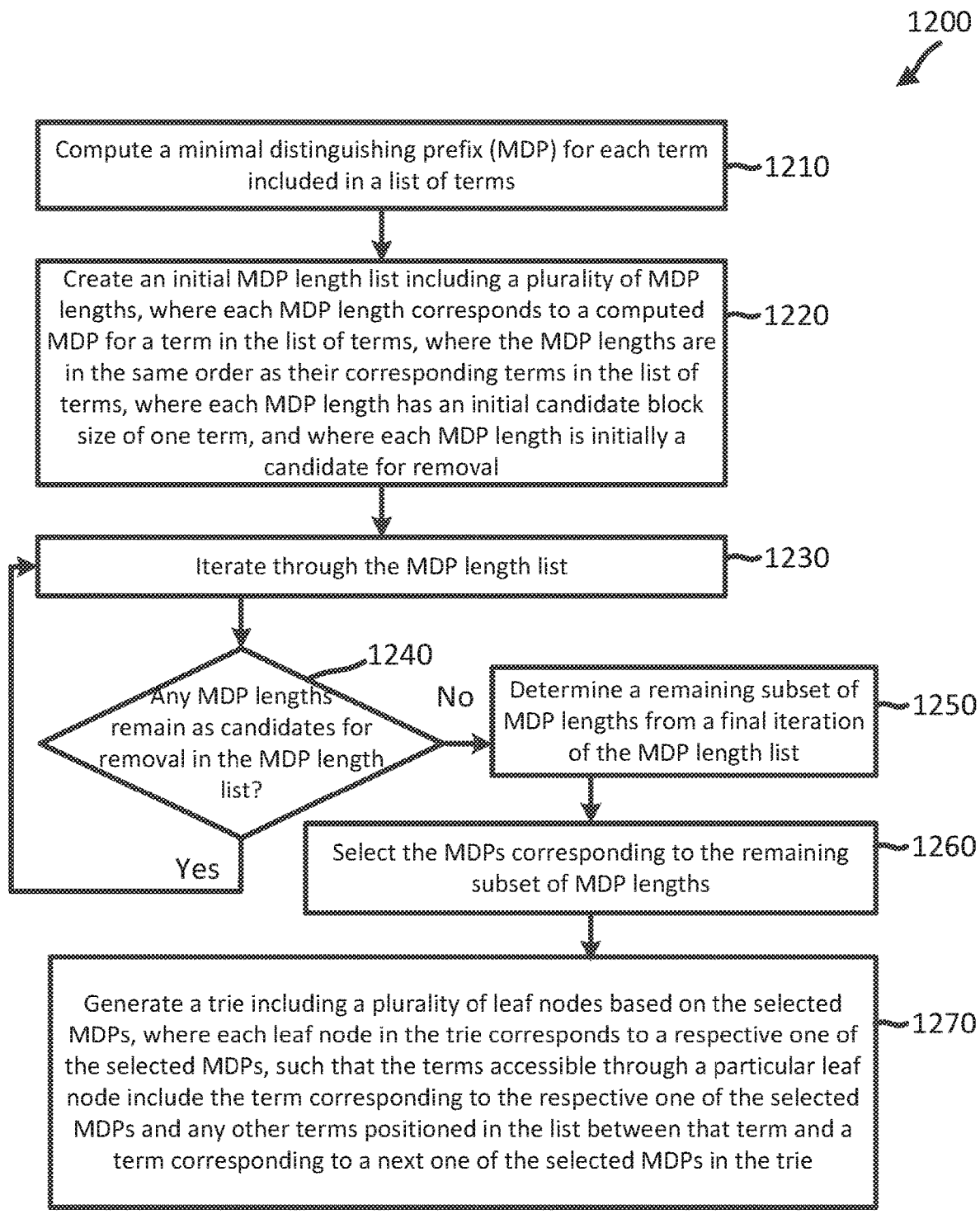
FIG. 12 is a simplified diagram of a method for indexing items in accordance with a clustering-based partitioning scheme in a database environment according to some embodiments.

FIG. 12 is a simplified diagram of a method 1200 for indexing items in accordance with a clustering-based partitioning scheme in a database environment according to some embodiments. One or more of the processes 1210-1270 of the method 1200 may be implemented, at least in part, in the form of executable code stored on non-transitory, tangible, machine-readable media that when run by one or more processors may cause the one or more processors to perform one or more of the processes 1210-1270. In some embodiments, method 1200 can be performed by one or more computing devices in systems or diagrams 100, 200, 300, and 600 of FIGS. 1, 2, 3, and 6, respectively, including the MDP computation module 308, MDP selector 310, and/or trie generator 312. Aspects of the processes 1210-1270 of method 1200 have been covered in the description for FIGS. 1, 2, 3, 4A-4H, 5, and 6; and additional aspects are provided below.

In FIG. 12, at a process 1210, the MDP computation module 308 computes a MDP for each term included in a list of terms. The MDP for a term is the minimal prefix that differentiates the term from its immediately preceding term.

At a process 1220, the MDP selector 310 creates an initial MDP length list including a plurality of MDP lengths, where each MDP length corresponds to a computed MDP for a term in the list of terms, where the MDP lengths are in the same order as their corresponding terms in the list of terms, where each MDP length has an initial candidate block size of one term, and where each MDP length is initially a candidate for removal.

At a process 1230, the MDP selector 310 iterates through the MDP length list. The process 1230 is further discussed in relation to FIG. 13. At a process 1240, the MDP selector 310 determines whether any MDP lengths remain as candidates for removal in the MDP length list. If so, method 1200 proceeds from process 1240 to process 1230. If not, method 1200 proceeds from process 1240 to process 1250. At process 1250, the MDP selector 310 determines a remaining subset of MDP lengths from a final iteration of the MDP length list.

At a process 1260, the MDP selector 310 selects the MDPs corresponding to the remaining subset of MDP lengths. At a process 1270, the trie generator 312 generates a trie 632 including a plurality of leaf nodes based on the selected MDPs, where each leaf node in the trie corresponds to a respective one of the selected MDPs, such that the terms accessible through a particular leaf node include the term corresponding to the respective one of the selected MDPs and any other terms positioned in the list between that term and a term corresponding to a next one of the selected MDPs in the trie.

Figure 13:
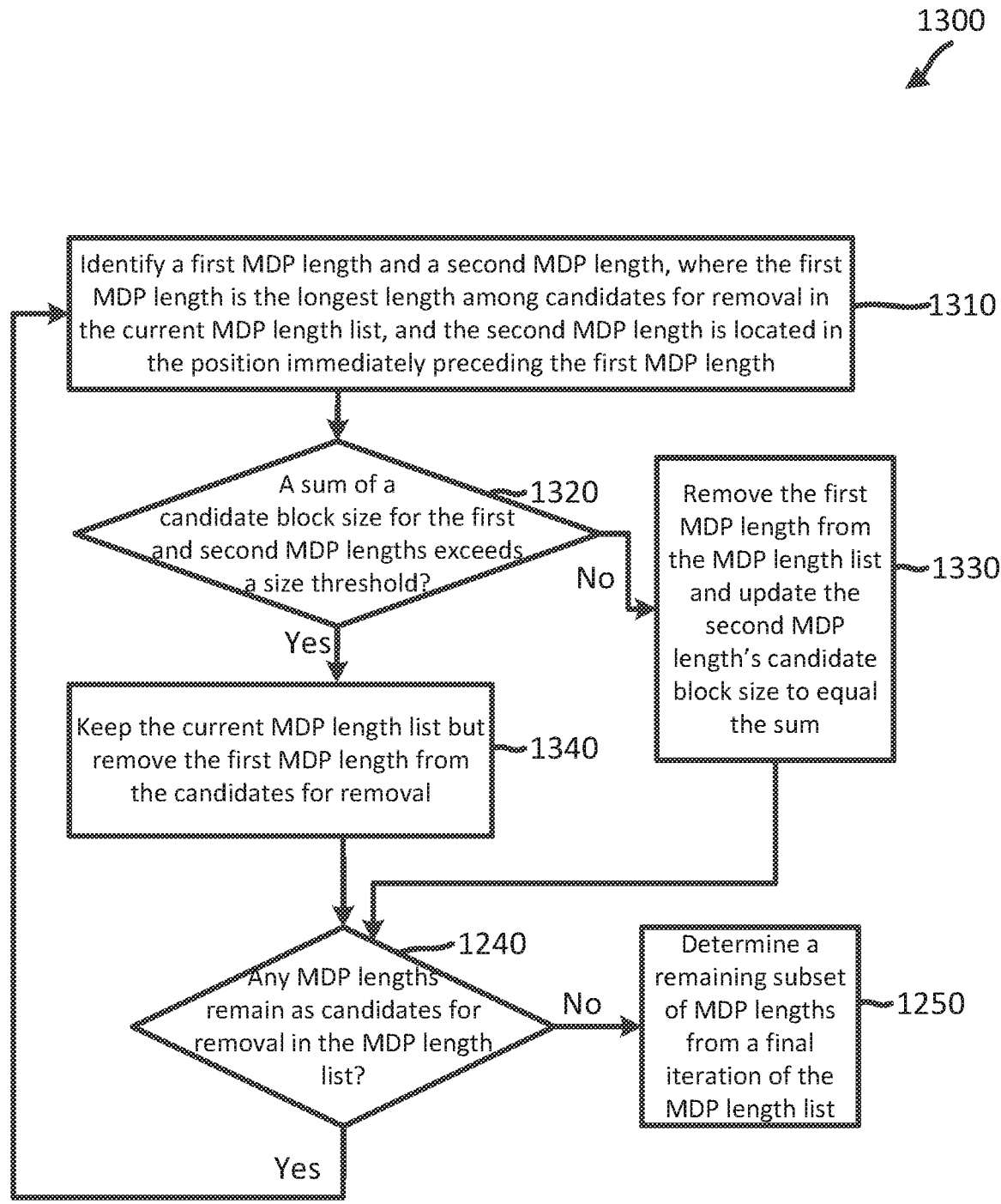
FIG. 13 is a simplified diagram of a method for iterating a MDP length list in accordance with the clustering-based partitioning scheme according to some embodiments.

FIG. 13 is a simplified diagram of a method 1300 for iterating a MDP length list in accordance with the clustering-based partitioning scheme according to some embodiments. One or more of the processes 1310-1340, 1240, and 1250 of the method 1300 may be implemented, at least in part, in the form of executable code stored on non-transitory, tangible, machine-readable media that when run by one or more processors may cause the one or more processors to perform one or more of the processes 1310-1340, 1240, and 1250. In some embodiments, method 1300 can be performed by one or more computing devices in systems or diagrams 100, 200, 300, and 600 of FIGS. 1, 2, 3, and 6, respectively, including the MDP computation module 308, MDP selector 310, and/or trie generator 312. Aspects of the processes 1310-1340, 1240, and 1250 of method 1300 have been covered in the description for FIGS. 1, 2, 3, 4A-4H, 5, and 6; and additional aspects are provided below.

A portion of method 1300 may correspond to the one or more iterations of the MDP length list provided for by process 1240 of method 1200. Process 1240 may include one or more of processes 1310, 1320, 1330, 1340, 1240, or 1250. In an example, for each subsequent iteration of the MDP length list, the MDP selector 310 may perform one or more of processes 1310, 1320, 1330, 1340, 1240, or 1250.

At a process 1310, the MDP selector 310 identifies a first MDP length and a second MDP length, where the first MDP length is the longest length among candidates for removal in the current MDP length list, and the second MDP length is located in the position immediately preceding the first MDP length.

At a process 1320, the MDP selector 310 determines whether a sum of a candidate block size for the first and second MDP lengths exceeds a size threshold. If not, method 1300 proceeds from process 1320 to process 1330. At process 1330, the MDP selector 310 removes the first MDP length from the MDP length list and updates the second MDP length's candidate block size to equal the sum. If so, method 1300 proceeds from process 1320 to process 1340. At process 1340, the MDP selector 310 keeps the current MDP length list but removes the first MDP length from the candidates for removal. If the first and second MDP lengths do not exceed the size threshold, then the terms corresponding to the first and second MDP lengths may be included in the same block.

Method 1300 proceeds from process 1330 or process 1340 to process 1240. At process 1240, the MDP selector 310 determines whether any MDP lengths remain as candidates for removal in the MDP length list. If so, method 1300 proceeds from process 1240 to process 1310. If not, method 1300 proceeds from process 1240 to process 1250.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Unless specifically stated otherwise as apparent from the following discussion, it is appreciated that throughout the description, discussions utilizing terms such as "determining," "computing," "generating," "comparing," "selecting," "identifying," "creating," "determining," "partitioning," "removing," "iterating," "generating," "receiving," "navigating," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may include a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modifications, changes and substitutions is contemplated in the foregoing disclosure and in some instances, some features of the embodiments may be employed without a corresponding use of other features. One of ordinary skill in the art would recognize many variations, alternatives, and modifications. Thus, the scope of the disclosure should be limited only by the following claims, and it is appropriate that the claims be construed broadly and in a manner consistent with the scope of the embodiments disclosed herein.

What is claimed is:

1. A computing device comprising:
a communication interface receiving a list of terms;
a memory containing machine readable medium storing machine executable code; and
one or more processors coupled to the memory and configurable to execute the machine executable code to cause the one or more processors to:
compute a minimal distinguishing prefix (MDP) for a term included in the list of terms;
create an initial MDP length list including a plurality of MDP lengths that correspond to computed MDPS of the list of terms, respectively;
iterate through the initial MDP length list to progressively generate a subset of MDP lengths based on candidate block sizes corresponding to the plurality of MDP lengths;
select a set of MDPs corresponding to the subset of MDP lengths; and
generate a trie including a plurality of leaf nodes based on the selected set of MDPs, wherein each leaf node in the trie corresponds to a respective selected MDP.

2. The computing device of claim 1, wherein the machine executable code is executed to cause the one or more processors further to:
iterate through the initial MDP length list by determining whether any MDP lengths remain as candidates for removal in a current MDP length list at each iteration.

3. The computing device of claim 2, wherein the machine executable code is executed to cause the one or more processors further to:
identify, at each iteration, a first MDP length and a second MDP length from the current MPD length list,
wherein the first MDP length is a longest length among candidates for removal in the current MDP length list, and the second MDP length is located in a position immediately preceding the first MDP length; and determine whether a sum of a candidate block size for the first MDP length and the second MDP length exceeds a size threshold.

4. The computing device of claim 3, wherein the machine executable code is executed to cause the one or more processors further to:
remove the first MDP length from the current MDP length list and update a candidate block size of the second MDP length to be the sum when the sum does not exceed the size threshold; and
remove the first MDP length from the candidates for removal when the sum exceeds the size threshold.

5. The computing device of claim 4, wherein the machine executable code is executed to cause the one or more processors further to:
determine whether any MDP lengths in the current MDP length list remain as candidates for removal; and
determine the subset of MDP lengths as remaining MDP lengths in the current MDP length list when no MDP length in the current MDP length list remains as candidates for removal.

6. The computing device of claim 1, wherein the machine executable code is executed to cause the one or more processors further to:
partition the list of terms into a plurality of blocks, each block including a block key, wherein the block key is the first term in the block, wherein the MDP is computed for a block key and for a plurality of terms within a threshold distance of the block key.

7. The computing device of claim 1, wherein the each leaf node in the trie corresponds to a respective one of the selected MDPs, such that the terms accessible through a particular leaf node include the term corresponding to the respective one of the selected MDPs and any other terms positioned in the list between that term and another term corresponding to a next one of the selected MDPs in the trie.

8. The computing device of claim 1, wherein the machine executable code further causes the one or more processors to:
partition, based on a size threshold, the list of terms into the plurality of blocks, each block of the plurality of blocks containing at most a difference of one for a number of terms included in the respective block.

9. The computing device of claim 4, wherein the machine executable code further causes the one or more processors to:
partition the first plurality of blocks into a second plurality of blocks, each block key in the second plurality of blocks being a respective term corresponding to the respective one of the selected MDPs.

10. The computing device of claim 4, wherein the machine executable code further causes the one or more processors to:
for one or more blocks of the plurality of blocks:
determine a length of a prefix that a first term has in common with a second term in the second plurality of blocks, the first term being located in the position immediately preceding the second term; and
replace the prefix in the second term with a binary representation of the length.

11. A method comprising:
receiving, via a communication interface, a list of terms;
computing, via a processor, a minimal distinguishing prefix (MDP) for a term included in the list of terms;
creating an initial MDP length list including a plurality of MDP lengths that correspond to computed MDPS of the list of terms, respectively;
iterating through the initial MDP length list to progressively generate a subset of MDP lengths based on candidate block sizes corresponding to the plurality of MDP lengths;
selecting a set of MDPs corresponding to the subset of MDP lengths; and
generating a trie including a plurality of leaf nodes based on the selected set of MDPs, wherein each leaf node in the trie corresponds to a respective selected MDP.

12. The method of claim 11, further comprising:
iterating through the initial MDP length list by determining whether any MDP lengths remain as candidates for removal in a current MDP length list at each iteration.

13. The method of claim 12, further comprising:
identifying, at each iteration, a first MDP length and a second MDP length from the current MPD length list, wherein the first MDP length is a longest length among candidates for removal in the current MDP length list, and the second MDP length is located in a position immediately preceding the first MDP length; and
determining whether a sum of a candidate block size for the first MDP length and the second MDP length exceeds a size threshold.

14. The method of claim 13, further comprising:
removing the first MDP length from the current MDP length list and update a candidate block size of the second MDP length to be the sum when the sum does not exceed the size threshold; and
removing the first MDP length from the candidates for removal when the sum exceeds the size threshold.

15. The method of claim 14, further comprising:
determining whether any MDP lengths in the current MDP length list remain as candidates for removal; and
determining the subset of MDP lengths as remaining MDP lengths in the current MDP length list when no MDP length in the current MDP length list remains as candidates for removal.

16. The method of claim 11, further comprising:
partitioning the list of terms into a plurality of blocks, each block including a block key, wherein the block key is the first term in the block, wherein the MDP is computed for a block key and for a plurality of terms within a threshold distance of the block key.

17. The method of claim 11, wherein the each leaf node in the trie corresponds to a respective one of the selected MDPs, such that the terms accessible through a particular leaf node include the term corresponding to the respective one of the selected MDPs and any other terms positioned in the list between that term and another term corresponding to a next one of the selected MDPs in the trie.

18. The method of claim 14, further comprising:
partitioning the first plurality of blocks into a second plurality of blocks, each block key in the second plurality of blocks being a respective term corresponding to the respective one of the selected MDPs.

19. The method of claim 14, further comprising:
for one or more blocks of the plurality of blocks:
determining a length of a prefix that a first term has in common with a second term in the second plurality of blocks, the first term being located in the position immediately preceding the second term; and
replacing the prefix in the second term with a binary representation of the length.

20. A non-transitory processor-readable medium storing a plurality of processor-executable instructions, the instructions being executable by a processor to perform operations comprising:
- receiving, via a communication interface, a list of terms;
- computing, via a processor, a minimal distinguishing prefix (MDP) for a term included in the list of terms;
- creating an initial MDP length list including a plurality of MDP lengths that correspond to computed MDPS of the list of terms, respectively;
- iterating through the initial MDP length list to progressively generate a subset of MDP lengths based on candidate block sizes corresponding to the plurality of MDP lengths;
- selecting a set of MDPs corresponding to the subset of MDP lengths; and
- generating a trie including a plurality of leaf nodes based on the selected set of MDPs, wherein each leaf node in the trie corresponds to a respective selected MDP.

* * * * *

UNITED STATES PATENT AND TRADEMARK OFFICE
CERTIFICATE OF CORRECTION

| | |
|---|---|
| PATENT NO. | : 11,726,973 B2 |
| APPLICATION NO. | : 17/347156 |
| DATED | : August 15, 2023 |
| INVENTOR(S) | : Bruno Roustant and Juan Camilo Rodriguez Duran |

It is certified that error appears in the above-identified patent and that said Letters Patent is hereby corrected as shown below:

On the Title Page

Item [54], and in the Specification, Column 1, Line 1, Change "Hems" to "Items".

Signed and Sealed this
Nineteenth Day of September, 2023

Katherine Kelly Vidal
*Director of the United States Patent and Trademark Office*